(12) United States Patent
Petrowsky et al.

(10) Patent No.: US 12,300,805 B2
(45) Date of Patent: May 13, 2025

(54) COMPOSITIONS AND METHODS FOR ENERGY STORAGE DEVICES INCLUDING SALTS AND/OR FOAMS

(71) Applicant: Tesla, Inc., Austin, TX (US)

(72) Inventors: Matt Petrowsky, San Diego, CA (US); Joon Ho Shin, San Diego, CA (US); Hieu Minh Duong, Rosemead, CA (US); Vicente Tapia, Chula Vista, CA (US)

(73) Assignee: Tesla, Inc., Austin, TX (US)

( * ) Notice: Subject to any disclaimer, the term of this patent is extended or adjusted under 35 U.S.C. 154(b) by 722 days.

(21) Appl. No.: 17/291,491

(22) PCT Filed: Nov. 7, 2019

(86) PCT No.: PCT/US2019/060263
§ 371 (c)(1),
(2) Date: May 5, 2021

(87) PCT Pub. No.: WO2020/097327
PCT Pub. Date: May 14, 2020

(65) Prior Publication Data
US 2022/0006071 A1    Jan. 6, 2022

Related U.S. Application Data

(60) Provisional application No. 62/757,620, filed on Nov. 8, 2018.

(51) Int. Cl.
*H01M 4/04* (2006.01)
*H01G 11/56* (2013.01)
(Continued)

(52) U.S. Cl.
CPC ............ *H01M 4/139* (2013.01); *H01G 11/56* (2013.01); *H01M 4/0435* (2013.01);
(Continued)

(58) Field of Classification Search
None
See application file for complete search history.

(56) References Cited

U.S. PATENT DOCUMENTS

| 4,014,712 A | 3/1977 | Bryndal |
| 5,595,837 A | 1/1997 | Olsen et al. |

(Continued)

FOREIGN PATENT DOCUMENTS

| CN | 103794754 A | * | 5/2014 | |
| CN | 105585724 A | * | 5/2016 | ............... C08J 5/18 |

(Continued)

OTHER PUBLICATIONS

Translation of CN-103794754-A (Year: 2014).*
(Continued)

*Primary Examiner* — Gregg Cantelmo
(74) *Attorney, Agent, or Firm* — Knobbe, Martens, Olson & Bear, LLP

(57) ABSTRACT

An energy storage device can include a cathode, an anode, and a separator between the cathode and the anode. At least one of the electrodes can include an electrode film prepared by a dry process. The electrode film, the electrode and/or the separator can comprise a salt, improved porosity, increased density, be prelithiated, and/or a foam. An energy storage device can include a dry composite solid polymer electrolyte (SPE) film. Process and apparatuses used for fabricating the composite solid polymer electrolyte film, electrode and/or electrode film are also described.

11 Claims, 16 Drawing Sheets

(51) Int. Cl.

| | | |
|---|---|---|
| H01M 4/02 | (2006.01) | |
| H01M 4/139 | (2010.01) | |
| H01M 4/36 | (2006.01) | |
| H01M 4/62 | (2006.01) | |
| H01M 10/04 | (2006.01) | |
| H01M 10/052 | (2010.01) | |
| H01M 10/0525 | (2010.01) | |
| H01M 10/056 | (2010.01) | |
| H01M 10/0565 | (2010.01) | |
| H01M 10/058 | (2010.01) | |
| H01M 50/403 | (2021.01) | |
| H01M 50/414 | (2021.01) | |
| H01M 50/42 | (2021.01) | |
| H01M 50/426 | (2021.01) | |
| H01M 50/431 | (2021.01) | |
| H01M 50/434 | (2021.01) | |
| H01M 50/437 | (2021.01) | |
| H01M 50/446 | (2021.01) | |

(52) U.S. Cl.
CPC ............ *H01M 4/366* (2013.01); *H01M 4/622* (2013.01); *H01M 10/049* (2013.01); *H01M 10/052* (2013.01); *H01M 10/0525* (2013.01); *H01M 10/056* (2013.01); *H01M 10/0565* (2013.01); *H01M 10/058* (2013.01); *H01M 50/403* (2021.01); *H01M 50/414* (2021.01); *H01M 50/42* (2021.01); *H01M 50/426* (2021.01); *H01M 50/431* (2021.01); *H01M 50/434* (2021.01); *H01M 50/437* (2021.01); *H01M 50/446* (2021.01); *H01M 2004/021* (2013.01); *H01M 2300/0068* (2013.01); *H01M 2300/0082* (2013.01); *H01M 2300/0091* (2013.01)

(56) References Cited

U.S. PATENT DOCUMENTS

| | | | |
|---|---|---|---|
| 5,743,921 | A | 4/1998 | Nazri et al. |
| 2007/0172739 | A1* | 7/2007 | Visco ............... H01B 1/122 429/246 |
| 2013/0011746 | A1* | 1/2013 | Tatsumisago ....... H01M 10/052 429/322 |
| 2013/0157122 | A1 | 6/2013 | Tsai et al. |
| 2013/0164631 | A1* | 6/2013 | Ohtomo ............ H01M 10/0562 429/319 |
| 2014/0011100 | A1* | 1/2014 | Lee ................. H01M 10/052 429/189 |
| 2015/0303481 | A1 | 10/2015 | Duong |
| 2016/0043384 | A1* | 2/2016 | Zhamu .............. H01M 4/386 427/122 |
| 2016/0064785 | A1* | 3/2016 | Kim ................. H01M 50/46 429/405 |
| 2016/0240838 | A1* | 8/2016 | Hayashi ............. H01M 10/052 |
| 2017/0025683 | A1 | 1/2017 | Park et al. |
| 2017/0033363 | A1* | 2/2017 | Verma .............. H01M 4/362 |
| 2017/0244098 | A1 | 8/2017 | Duong et al. |
| 2017/0256367 | A1 | 9/2017 | Raman et al. |

FOREIGN PATENT DOCUMENTS

| | | | | |
|---|---|---|---|---|
| CN | 106463267 | | 2/2017 | |
| CN | 107611340 | | 1/2018 | |
| CN | 108400017 | | 8/2018 | |
| DE | 102017204826 | | 9/2018 | |
| JP | 55-032345 | | 3/1980 | |
| JP | 04-264362 | | 9/1992 | |
| JP | 05-205777 | | 8/1993 | |
| JP | 2004-521453 | | 7/2004 | |
| JP | 2008-257882 | | 10/2008 | |
| JP | 2014043487 | A * | 3/2014 | |
| JP | 2017-183115 | | 10/2017 | |
| KR | 10-2016-0135589 | | 11/2016 | |
| WO | WO 13/082330 | | 6/2013 | |
| WO | WO-2017161160 | A1 * | 9/2017 | ......... H01M 10/052 |
| WO | WO 18/008500 | | 1/2018 | |

OTHER PUBLICATIONS

Safanama et al.; "Lithium conducting solid electrolyte Li1+xAlxGe2-x(PO4)3 membrane for aqueous lithium air battery"; Solid State Ionics, 262, pp. 211-215. (Year: 2014).*

Machine Translation of CN 105585724A (Year: 2016).* www.scifinder.com CAS 409071-16-5 substance search (Year: Unknown).*

Machine Translation of JP 2014043487-A (Year: 2014).*

Fergus, 2010, Ceramic and polymeric solid electrolytes for lithium-ion batteries, J. Power Sources, 195:4554-4569.

Kim et al., 2007, Ion conductivity of polymer electrolyte based on PEO containing Li salt and additive salt, Solid State Phenomena, 119:119-122.

Lee et al., 2017, Selection of binder and solvent for solution-processed all-solid-state battery, J. Electrochemical Society, 164(9):A2075-A2081.

Tan et al., 2012, Garnet-type Li7La3Zr2O12 electrolyte prepared by a solution-based technique for lithium ion battery, Materials Research Society, Symposium Proceeding, 1440:1-6.

Yao et al., 2007, LiFePO$_4$-based electrode using micro-porous current collector for high power lithium ion battery, Journal of Power Sources, 173:545-549.

International Search Report and Written Opinion dated Jun. 24, 2020 in application No. PCT/US2019/060263.

Wood et al., Aug. 29, 2017, Technical and economic analysis of solvent-based lithium-ion electrode drying with water and NMP, Drying Technology, 36(2):1-11.

McKeen, Film Properties of Plastics and Elastomers, Chapter 11—Fluoropolymers, p. 255, Apr. 13, 2012.

Yan et al., Perovskite Solid-State Electrolytes for Lithium Metal Batteries, Batteries 2021, 7(4), 75, Nov. 7, 2021.

Wu et al., Recent Advances in Li1+$_x$Al$_x$Ti$_{2-x}$(PO$_4$)$_3$ Solid-State Electrolyte for Safe Lithium Batteries, Advanced Energy Materials, vol. 13, Issue 4, ISSN 1614-6832, Dec. 11, 2022.

Takahashi et al., Ion exchange properties and selectivity of lithium isotopes on ion exchangers in the hydrogen form prepared from LiTi$_x$Zr$_{2-x}$(PO$_4$)$_3$ (0 ≤ x ≤ 2), Apr. 2006, Journal of Materials Chemistry, 16(15):1462-1469.

* cited by examiner (a)

(b)

COMPOSITIONS AND METHODS FOR ENERGY STORAGE DEVICES INCLUDING SALTS AND/OR FOAMS

INCORPORATION BY REFERENCE TO ANY PRIORITY APPLICATIONS

This application claims priority to PCT Application No. PCT/US2019/060263 filed on Nov. 7, 2019, which claims priority to U.S. Provisional App. No. 62/757,620 filed on Nov. 8, 2018, each of which are incorporated by reference in their entirety.

BACKGROUND

Field of the Invention

The present invention relates to energy storage devices, particularly to compositions of and methods for fabricating energy storage device electrodes.

Description of the Related Art

Various types of energy storage devices can be used to power electronic devices, including for example, capacitors, batteries, capacitor-battery hybrids and/or fuel cells. An energy storage device, such as a traditional or solid-state lithium ion capacitor or battery, having an electrode prepared using an improved electrode formulation and/or fabrication process can facilitate improved capacitor electrical performance. A lithium ion capacitor or battery having an electrode prepared using an improved electrode formulation and/or fabrication process may demonstrate improved cycling performance, reduced equivalent series resistance (ESR) values, increased power density performance and/or increased energy density performance. Improved electrode formulations and/or fabrication processes may also facilitate lower costs of energy storage device fabrication.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a dry electrode film of an energy storage device is provided. The dry electrode films includes a dry active material; a dry binder; and a dry electrolyte salt. The dry electrode film is free-standing.

In some embodiments, the dry electrolyte salt is selected from $LiPF_6$, $LiBF_4$, LiBOB, $LiN(SO_2CF_3)_2$, $LiOSO_2CF_3$, $LiNO_3$, a lithium acetate, a lithium halide, a tetra-alkylammonium tetrafluoroborate, a tetra-alkylammonium hexafluorophosphate, a garnet ion conductor, a sulfur based ion conductor, $Li_{0.5}La_{0.5}TiO_3$ (LLTO), $Li_7La_3Zr_2O_{12}$ (LLZO), a Lithium Super Ionic Conductor (LISCON), lithium hexafluorophosphate, lithium bis(trifluoromethanesulfonyl)imide, lithium tetrafluoroborate, lithium trifluoromethanesulfonate, lithium perchlorate, lithium bis(trifluoromethane sulfonimide (LiTFSI), lithium bis(oxalato)borate, $Li_{6.4}La_3Zr_{1.4}Ta_{0.6}O_2$, $Li_{10}SnP_2S_{12}$, $Li_{3x}La_{2/3-x}TiO_3$, $Li_{0.8}La_{0.6}Zr_2(PO_4)_3$, $Li_{1+x}Ti_{2-x}Al_x(PO_4)_3$, $Li_{1+x+y}Ti_{2-x}Al_xSi_y(PO_4)_{3-y}$, and $LiTi_xZr_{2-x}(PO_4)_3$, or a combination thereof.

In some embodiments, the dry electrolyte salt comprises 1-10 wt. % of the dry electrode film. In some embodiments, the dry electrode film has a thickness of at least 110 sm. In some embodiments, the dry electrode film has an electrode film density of at least 0.8 g/cm$^3$.

In some aspects, a dry gradient electrode film of an energy storage device is provided. The dry gradient electrode film includes a first dry electrode film of the dry electrode film of an energy storage device, comprising a first concentration of electrolyte salt, and a second dry electrode film of the dry electrode film of an energy storage device, comprising a second concentration of electrolyte salt, wherein the first concentration of electrolyte salt is less than the second concentration of electrolyte salt.

In some aspects, a solid state energy storage device comprising the dry electrode film of the dry electrode film of an energy storage device is provided, wherein the solid state energy storage device does not comprise a liquid solvent.

In some aspects, an energy storage device comprising the dry electrode film of the dry electrode film of an energy storage device and a solvent contained within a device housing is provided. In some embodiments, the solvent is a highly volatile solvent.

In some aspects, a battery comprising the dry electrode film of the dry electrode film of an energy storage device is provided.

In a second aspect, a method of fabricating a dry electrode film of an energy storage device is provided. The method includes providing a dry active material, a dry binder, and a dry electrolyte salt. The method further includes forming a free standing dry electrode film from the dry active material, the dry binder, and the dry electrolyte salt.

In some embodiments, the method further comprises exposing the dry electrode film to a solvent, thereby dissolving the electrolyte salt. In some embodiments, the method further comprises placing the dry electrode film into an energy storage device housing, wherein exposing the dry electrode film to a solvent occurs within the energy storage device housing. In some embodiments, the method further comprises placing the dry electrode film into an energy storage device housing, wherein exposing the dry electrode film to a solvent occurs prior to placing the dry electrode the energy storage device housing. In some embodiments, the method further comprises prelithiation of the dry electrode film during the step of exposing the dry electrode film to a solvent. In some embodiments, the method further comprises rolling the lithiated dry electrode.

In a third aspect, a foam-active material composite of an energy storage device is provided. The composite includes a dry active material; a dry binder; and a foam.

In a fourth aspect, a foam-active material composite of an energy storage device is provided. The composite includes a dry active material and a foam.

In some embodiments, the foam is a metallic foam, a ceramic foam, or a combination thereof. In some embodiments, the dry active material is encapsulated by the foam. In some embodiments, the foam further comprises a dry binder. In some embodiments, the dry active material and the dry binder are encapsulated by the foam.

In some aspects, an electrode of an energy storage device comprising the foam-active material composite and without a separate current collector is provided.

In some aspects, an electrode of an energy storage device comprising the foam-active material composite, further comprising a current collector is provided.

In a fifth aspect, a dry composite solid polymer electrolyte (SPE) film of an energy storage device is provided. The SPE film includes a dry ion conducting polymer; a dry lithium source; a dry binder; an ion conducting medium; and a dry filler material.

In some embodiments, the dry ion conducting polymer is selected from polyethylene oxide (PEO), polyvinylidene fluoride (PVDF), poly(methylene oxide), polyoxymethylene, poly(vinyl alcohol) (PVA), poly(vinyl pyrrolidone) (PVP), poly(methyl methacrylate), poly(vinyl acetate), poly(vinylchloride), poly(vinyl acetate), poly(oxyethylene)$_9$methacrylate, poly(ethylene oxide) methyl ether methacrylate, and poly(propylenimine), or a combination thereof. In some embodiments, the dry lithium source is selected from lithium perchlorate ($LiClO_4$), lithium tetrafluoroborate ($LiBF_4$), lithium hexafluorophosphate ($LiPF_6$), lithium bis(trifluoromethane sulfonimide) (LiTFSI) ($Li(C_2F_5SO_2)_2N$), lithium bis(oxalato)borate ($LiB(C_2O_4)_2$), lithium trifluoromethanesulfonate ($LiCF_3SO_3$), lithium bis(pentafluoroethanesulfonyl)imide ($C_4F_{10}LiNO_4S_2$), lithium bis(fluorosulfonyl)imide ($F_2LiNO_4S_2$), lithium difluoro(oxalato)borate ($LiBF_2(C_2O_4)$), lithium difluorophosphate ($F_2LiO_2P$), lithium trifluorochloroborate ($LiBF_3Cl$), lithium hexafluoroarsenate ($LiAsF_6$), $Li_{6.4}La_3Zr_{1.4}Ta_{0.6}O_{12}$, $Li_7La_3Zr_2O_{12}$, $Li_{10}SnP_2S_{12}$, $Li_3xLa_{2/3x}TiO_3$, $Li_{0.8}La_{0.6}Zr_2(PO_4)_3$, $Li_{1+x}Ti_{2-x}Al_x(PO_4)_3$, $Li_{1+x+y}Ti_{2-x}Al_xSi_y(PO_4)_{3-y}$, and $LiTi_xZr_{2-x}(PO_4)_3$, or a combination thereof. In some embodiments, the dry filler is selected from titanium oxide ($TiO_2$), silica ($SiO_2$), silicon oxide (SiO), copper oxide (CuO), montmorillonite (($Na,Ca)_{0.33}(Al,Mg)_2(Si_4O_{10})$), bentonite ($Al_2O_{34}SiO_2H_2O$), kaolinite ($Al_2Si_2O_5(OH)_4$), hectorite ($Na_{0.3}(Mg,Li)_3Si_4O_{10}(OH)_2$), and halloysite ($Al_2Si_2O_5(OH)_4$), 4'-Amino-2,3'-dimethylazobenzene ($CH_3C_6H_4N=NC_6H_3(CH_3)NH_2$), yttrium aluminum oxide ($Y_3Al_5O_{12}$), yttrium iron oxide ($Y_3Fe_5O_{12}$) and nanoclay, or a combination thereof. In some embodiments, the ion conducting medium is selected from nanoclay and garnet, or a combination thereof.

In some aspects, an energy storage device is provided. The energy storage devices includes a dry cathode electrode comprising a dry electrode film, the dry composite SPE film, and a lithium metal anode.

In some embodiments, the energy storage device is a solid state energy storage device that does not comprise a liquid solvent.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Definitions

Figure 1:
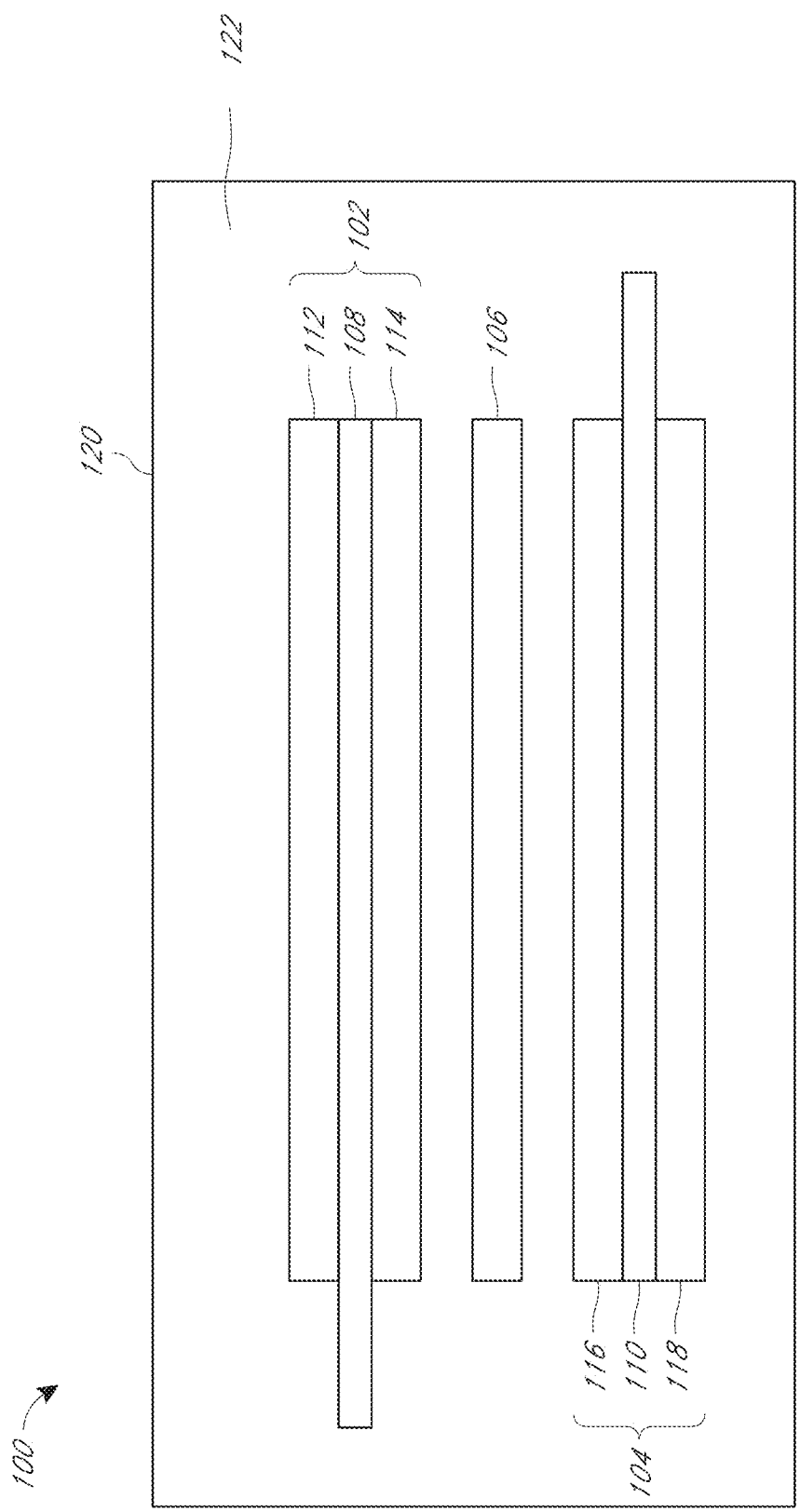
FIG. 1 shows a side cross-sectional schematic view of an example of an energy storage device, according to one embodiment.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector, support webs or other structures, although supporting elements may be employed to facilitate the energy storage device fabrication processes. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

As provided herein, a "solvent-free" electrode film is an electrode film that contains no detectable processing solvents, processing solvent residues, or processing solvent impurities. A dry electrode film, such as a cathode electrode film or an anode electrode film, may be solvent-free.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Electrode film packing density or electrode film porosity is an important property in an energy storage device component for achieving improved electrochemical performance. Hence, the appropriate electrode film density needs to be determined and produced. The appropriate electrode film density is one that offers both high ionic and high electronic conductivity. In wet electrode coating processes, the electrode materials loading weight and electrode film density are produced in separate steps, and the electrode film density after the solvent has been removed is typically lower than that of the desired target electrode film density.

In dry electrode processes, the control over electrode film density and the target electrode materials loading weight is metered by controlling the thickness and amount of compression pressure applied to of the free-standing film, and is commonly achieved by successive calender passes. Hence, unlike wet coating technology, the independent control over electrode materials loading weight and electrode film thickness is restricted. Electrode film porosity in dry electrode film manufacturing is mainly controlled through powder formulation used to produce free-standing films. Particle size, surface chemistry and morphology are common properties that influence the electrode film density of a furnished dry free-standing electrode film.

In some instances, pore-forming materials may be added to the powder formulation and then removed to leave behind pore volume in the free-standing film. Pore-forming materials used are those that may require liquid extraction and post-rinsing steps, such as salts, or thermal decomposition to gaseous by-products. In some embodiments, the present disclosure provides materials and processes for producing dry processed electrode film with high porosity (low density), but without such post-processing steps that increase manufacturing costs.

Furthermore, in some embodiments, these materials and processes may also be used to prelithiate dry electrode films. Traditional processes for lithiating anodes utilize lithium metal as the counter electrode to lithiate electrodes in a reel-to-reel fashion. Low-cost salt approaches avoid the use of lithium metal, but traditionally require real-time monitoring and metering of salts into the electrolyte chamber in order to maintain sufficient lithium ion for the redox process in a continuous reel-to-reel lithiation using a galvanic cell. The present disclosure describes, in some embodiments, the use of electrode salt materials within dry electrode films that may be used to pre-lithiate the electrode films. In some embodiments, the pre-lithiation level may be tailored by adjusting the amount of electrode salt in the dry electrode film. In some embodiments, pre-lithiation of the electrode film also imparts increased electrode film porosity.

In another instance, these materials and processes may also be used to create solid-state electrodes. Typical commercial lithium ion batteries have flammable electrolytes, which lead to the possibility of fires or explosions when overcharged. Typical lithium ion battery electrodes are made from a wet processing method in which a slurry is made from an active material and a solvent. The solvent not only adds cost to the procedure and may degrade solid state energy storage device components, but commonly used solvents, such as N-methyl-2-pyrrolidone, can cause adverse health effects from repeated exposure.

Solid state batteries provide improved safety by employing non-flammable components. Additionally, solid state batteries are able to safely utilize elemental lithium metal as an electrode because dendrite formation is not as severe relative to typical liquid-based lithium ion batteries. Lithium metal offers a significantly higher theoretical specific capacity compared to graphite, and therefore it can improve energy density over typical lithium ion batteries. Furthermore, a dry electrode processing method is expected to be less expensive and safer than conventional methods. Typically, a solid state lithium battery comprises an ionic and/or electronic conducting cathode, a solid electrolyte and a lithium metal anode. In some embodiments, the solid state electrode comprises a dry solid electrolyte salt. In some embodiments, the solid electrolyte is an ion conducting inorganic solid electrolyte. In some embodiments, the solid electrolyte is a polymer-based film. In some embodiments, a dry processed composite solid polymer electrolyte (SPE).

In some instances, embodiments include dry electrode formulations and fabrication processes that achieve electrode films having a higher density of active materials, a greater electrode film thickness, a higher electrode film density, and/or a higher electronic density (for example, such as energy density, specific energy density, areal energy density, areal capacity and/or specific capacity). A higher density electrode film will generally include more active materials in a smaller volume. Specifically, smaller particle sizes and more intimate contact of active materials, binders, additives may be realized in dry processing. Dry processing methods traditionally used a high shear and/or high pressure processing step to break up and commingle electrode film materials, which may contribute to the structural advantages. The present disclosure teaches that in some embodiments, electrode densities and porosities can be modified by varying electrode material compositions, such as varying active materials, polymer binders and additives. It was further discovered that improved high electrode film densities at high loading may also be produced by controlling the electrode calendering process parameters, such as the calendering temperature, gap size, roll speed, sequence, and number of passes. Embodiments utilizing such processes and compositions show significantly improved electrode film density at high loadings. In some embodiments, calendering may be performed at round ambient temperature. In some embodiments, high loadings and high electrode film densities are achieved without issues such as cracking and/or delamination of the electrode film.

Although many embodiments and examples are described throughout the disclosure, those of skill in the art will appreciate that the disclosed embodiments may be used alone or used in combination. For example, high density electrode films may be utilized in solid state systems and/or thick electrode films. In another example, thick electrode films may be utilized in electrode films comprising an electrode salt, solid state systems, porous electrode films and/or electrodes or electrode films comprising a foam. In another example, electrodes or electrode films comprising a foam may be utilized in solid state systems, electrode films comprising an electrode salt, and/or porous electrode films. Although a number of non-limiting example combinations are listed herein, other combinations may also be possible.

In some embodiments, an energy storage device, such as a lithium ion capacitor (LiC) or a lithium ion battery, with improved electrical and/or mechanical performance characteristics is provided. In some embodiments, the device can have an electrode comprising an improved electrode film composition, which in turn can provide improved electrical and/or mechanical performance. In some embodiments, the electrode can be an anode or cathode.

Embodiments herein can comprise mixtures of materials for, electrode films, energy storage devices, and related methods having electrode salts. A number of electrical, mechanical performance and/or processing advantages may be realized by utilizing an electrode salt.

For instance, a dry electrode film may comprise an electrode salt wherein when the dry electrode film is exposed to solvent, the electrode salt dissolves into the solvent and thereby achieves a dry electrode film with increased porosity. In some embodiments, the solvent is placed into contact with the dry electrode film when introduced into a housing or container of the energy storage device, for example, wherein the electrode salt remains within the device to act as an electrolyte. In another example, the solvent comprising the dissolved electrode salt is removed and/or washed from the energy storage device container. In some embodiments, the solvent is introduced to the dry electrode film outside of the energy storage device container, thereby removing the electrode salt before the dry electrode film is laminated to the current collector as a dry electrode and/or is placed into the energy storage device container. In some embodiments, the dry electrode film is prelithiated concurrently when washed with a solvent and exposed to a current outside of the energy storage device container. In some embodiments, the dry electrode film is prelithiated subsequent to being washed with a solvent outside of the energy storage device container, for example prelithiation may occur within a separate pre-lithiation apparatus or within the energy storage device container.

In another instance, a dry electrode may comprise an electrode salt, and the dry electrode is utilized as a solid-state electrode in an energy storage device. In some embodiments, the solid-state electrode is a dry electrode that remains free of solvent when fully assembled and operating within the energy storage device container. In some embodiments, the electrode salt is highly conductive. Highly conductive salt typically have a relatively low lattice energy so that the salt will dissolve in a solvent to give a sufficiently high number of ions. For example, some highly conductive Li salts include $LiPF_6$, $LiClO_4$, and $LiN(SO_2CF_3)_2$.

In some embodiments, the electrode salt may be an ionic compound. In some embodiments, the electrode salt may be a solid electrolyte additive. In some embodiments, the electrode salt may be a compound with a high ionic conductivity. In some embodiments, the electrode salt may be a ceramic compound with a high ionic conductivity. In some embodiments, the electrode salt is selected from at least one of $LiPF_6$, $LiBF_4$, LiBOB, $LiN(SO_2CF_3)_2$, $LiOSO_2CF_3$, $LiNO_3$, lithium acetates, lithium halides, tetra-alkylammonium tetrafluoroborates, tetra-alkylammonium hexafluorophosphates, lithium fluoride, garnet ion conductors, for example $Li_5La_3Ta_2O_{12}$ and $Li_3N$, sulfur based ion conductors, for example $Li_2S-P_2S_5$ and $Li_2S-P_2S_5-Li_3PO_4$, and other compounds with high ionic conductivity, for example $Li_{0.5}La_{0.5}TiO_3$ (LLTO), $Li_7La_3Zr_2O_{12}$ (LLZO) and a Lithium Super Ionic Conductor (LISCON), for example the LISCON may have a molecular formula of $Li_{(2+2x)}Zn_{(1-x)}GeO_4$. In some embodiments, the electrode salt is selected from at least one of $LiPF_6$, $LiBF_4$, LiBOB, $LiN(SO_2CF_3)_2$, $LiOSO_2CF_3$, $LiNO_3$, lithium acetates, lithium halides, tetra-alkylammonium tetrafluoroborates and tetra-alkylammonium hexafluorophosphates. In some embodiments, the electrode salt is a lithium salt. In some embodiments, the lithium salt is selected from at least one of lithium hexafluorophosphate, lithium bis(trifluoromethanesulfonyl)imide, lithium tetrafluoroborate, lithium trifluoromethanesulfonate, lithium perchlorate and lithium fluoride. In some embodiments, the lithium salt is selected from at least one of lithium perchlorate ($LiClO_4$), lithium bis(trifluoromethane sulfonimide) (LiTFSI) ($Li(C_2F_5SO_2)_2N$), lithium bis(oxalato)borate ($LiB(C_2O_4)_2$), lithium trifluoromethanesulfonate ($LiCF_3SO_3$), $Li_{6.4}La_3Zr_{1.4}Ta_{0.6}O_2$, $Li_7La_3Zr_2O_{12}$, $Li_{10}SnP_2S_{12}$, $Li_3xLa_{2/3-x}TiO_3$, $Li_{0.8}La_{0.6}Zr_2(PO_4)_3$, $Li_{1+x}Ti_{2-x}Al_x(PO_4)_3$, $Li_{1+x+y}Ti_{2-x}Al_xSi_y(PO_4)_{3-y}$, and $LiTi_xZr_{2-x}(PO_4)_3$. In some embodiments, the electrode salt is lithium fluoride. In some embodiments, the electrode salt is a garnet ion conductor, for example, $Li_5La_3Ta_2O_{12}$ and $Li_3N$. In some embodiments, the electrode salt is a sulfur based ion conductor, for example $Li_2S-P_2S_5$ and $Li_2S-P_2S_5-Li_3PO_4$. In some embodiments, the electrode salt is another compound with high ionic conductivity, for example $Li_{0.5}La_{0.5}TiO_3$ (LLTO) and/or $Li_7La_3Zr_2O_{12}$ (lithium lanthanum zirconate or LLZO). In some embodiments, the electrode salt is a Lithium Super Ionic Conductor (LISCON), for example the LISCON may have a molecular formula of $Li_{(2+2x)}Zn_{(1-x)}GeO_4$. In some embodiments, the electrode salt does not degrade under normal energy storage device operation.

In some embodiments, the electrode salt comprises or comprises about 0.5 wt. %, 1 wt. %, 2 wt. %, 3 wt. %, 4 wt. %, 5 wt. %, 6 wt. %, 7 wt. %, 8 wt. %, 9 wt. %, 10 wt. % or 11 wt. % of the dry electrode mixture, or any range of values therebetween. For example, in some embodiments, the electrode salt comprises 1-10 wt. % of the dry electrode mixture.

In some embodiments, a solvent, for use as an electrolyte with a device or for use as a wash outside the device, is selected from at least one of carbonates, esters, amides, ethers, alcohols, sulfones and water. In some embodiments, the solvent is dimethyl carbonate. In some embodiments, the solvent is a highly volatile solvent, wherein the solvent is gaseous at ambient temperature and pressure. In some embodiments, the highly volatile solvent is a liquid at pressures above 1 atm. In some embodiments, the highly volatile solvent is a liquid below 20° C. In some embodiments, the highly volatile solvent has a boiling point at ambient pressure of about, or at most about, 10° C., 20° C., 30° C., 40° C., 50° C., 57° C., 60° C., 66° C., 70° C., 80° C., 90° C., 91° C. or 95° C., or any range of values therebetween. In some embodiments, the highly volatile solvent may be dimethyl carbonate, tetrahydrofuran (THF), methyl acetate, or mixtures thereof.

FIG. 1 shows a side cross-sectional schematic view of an example of an energy storage device 100 according to one or more embodiments of the present disclosure. The energy storage device 100 may be classified as, for example, a battery, capacitor, capacitor-battery hybrid, or fuel cell. In some embodiments, device 100 is a lithium ion battery. The device 100 has a first electrode 102, a second electrode 104, and a separator 106 positioned between the first electrode 102 and second electrode 104. The first electrode 102 and the second electrode 104 are adjacent to respective opposing surfaces of the separator 106. In some embodiments, the first electrode 102 can be an anode (the "negative electrode") and the second electrode 104 can be the cathode (the "positive electrode"). The energy storage device 100 includes an electrolyte 122 to facilitate ionic transport between the electrodes 102, 104 of the energy storage device 100. For example, the electrolyte 122 may be in contact with the first electrode 102, the second electrode 104 and the separator 106. The electrolyte 122, the first electrode 102, the second electrode 104, and the separator 106 are housed within an energy storage device housing 120. For example, the energy storage device housing 120 may be sealed subsequent to insertion of the first electrode 102, the second electrode 104 and the separator 106, and impregnation of the energy storage device 100 with the electrolyte 122, such that the first electrode 102, the second electrode 104, the separator 106, and the electrolyte 122 may be physically sealed from an environment external to the housing. It will be understood that energy storage device 100 is shown as a dual-electrode, dual layer device, but other types can be implemented, such as single-layer electrodes.

The energy storage device 100 can include any number of different types of electrolyte 122. For example, device 100 can include a lithium ion battery electrolyte, which can include a lithium source, such as a lithium salt, and a solvent, such as an organic solvent. In some embodiments, the device 100 can further include an additive, such as solid electrolyte interphase (SEI)-forming additive, an electrode wetting additive, or a separator wetting additive. In some embodiments, a lithium salt can include lithium hexafluorophosphate (LiPF$_6$), lithium tetrafluoroborate (LiBF$_4$), lithium perchlorate (LiClO$_4$), lithium bis(trifluoromethansulfonyl)imide (LiN(SO$_2$CF$_3$)$_2$), lithium trifluoromethansulfonate (LiSO$_3$CF$_3$), lithium bis(pentafluoroethanesulfonyl)imide (C$_4$F$_{10}$LiNO$_4$S$_2$), lithium bis(fluorosulfonyl)imide (F$_2$LiNO$_4$S$_2$), lithium bis(oxalato)borate (LiB(C$_2$O$_4$)$_2$), lithium difluoro(oxalato) borate (LiBF$_2$(C$_2$O$_4$), lithium difluorophosphate (F$_2$LiO$_2$P), lithium trifluorochloroborate (LiBF$_3$Cl), lithium hexafluoroarsenate (LiAsF$_6$), combinations thereof, and/or the like. In some embodiments, a lithium ion electrolyte solvent can include one or more ethers and/or esters. For example, a lithium ion electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. For example, the electrolyte may comprise LiPF$_6$, ethylene carbonate, propylene carbonate and diethyl carbonate.

In some embodiments, the electrolyte 122 of the energy storage device 100 comprises a solvent and at least one of the electrode salts described previously. In some embodiments, the energy storage device 100 is a solid-state energy storage device, and therefore the electrolyte 122 is absent of a solvent.

The separator 106 can be configured to electrically insulate two electrodes adjacent to opposing sides of the separator 106, such as the first electrode 102 and the second electrode 104, while permitting ionic transport between the two adjacent electrodes. The separator 106 can comprise a suitable porous electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material. In some embodiments, the separator can be a multilayer material, for example, such as PP/PE or PP/PE/PP. In some embodiments, the separator can be ceramic coated, for example, such as ceramic coated PE, PP, or a multilayer material.

In some embodiments, particularly when the energy storage device 100 is a solid-state energy storage device, separator 106 may be a solid-state electrolyte layer. In some embodiments, the solid-state electrolyte layer can comprise a solid polymer electrolyte (SPE).

As shown in FIG. 1, the first electrode 102 and the second electrode 104 include a first current collector 108 in contact with a first electrode film 112 and a second electrode film 114, and a second current collector 110 in contact with a third electrode film 116 and a fourth electrode film 118, respectively. The first current collector 108 and the second current collector 110 may facilitate electrical coupling between each corresponding electrode film and an external circuit (not shown). The first current collector 108 and/or the second current collector 110 comprise one or more electrically conductive materials, and have any suitable shape and size selected to facilitate transfer of electrical charge between the corresponding electrode and an external electrical circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit. In some embodiments, the current collector may comprise a foam as described herein. In some embodiments, one or more electrode films are encapsulated by the current collector.

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a third electrode film 116 (e.g., an upper electrode film) on a first surface of the second current collector 110 (e.g., on a top surface of the second current collector 110), and a fourth electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the third electrode film 116 of the second electrode 104. In some embodiments, an electrode may comprise more than one electrode film, for example, such as the first electrode film 112 and second electrode film 114 on the first current collector 108 of first electrode 102 shown in FIG. 1. In some embodiments, an electrode may comprise only one electrode film, for example, such that the first electrode 102 shown in FIG. 1 consists of the first electrode film 112 and the first current collector 108.

The electrode films 112 and/or 114 may be dry and/or self-supporting electrode films as provided herein, and having advantageous properties, such as increased thickness, increased electrode film density, increased electrode film porosity, increased energy density, increased specific energy density, increased areal energy, and/or increased areal capacity, as provided herein.

An electrode film may have a selected thickness suitable for certain applications. The thickness of an electrode film as provided herein may be greater than that of an electrode film prepared by conventional processes. In some embodiments, the electrode film can have a thickness of about, or greater than about, 30 microns, about 50 microns, about 100 microns, about 110 microns, about 115 microns, about 120 microns, about 130 microns, about 135 microns, about 150 microns, about 155 microns, about 160 microns, about 170 microns, about 200 microns, about 250 microns, about 260 microns, about 265 microns, about 270 microns, about 280 microns, about 290 microns, about 300 microns, about 350 microns, about 400 microns, about 450 microns, about 500 microns, about 750 microns, about 1 mm, or about 2 mm, or any range of values therebetween. An electrode film thickness can be selected to correspond to a desired areal capacity, specific capacity, areal energy density, energy density, or specific energy density. In some embodiments, the electrode film thickness corresponds to the thickness of a single electrode film. In some embodiments, the electrode film thickness corresponds to the thickness of a plurality of single electrode films formed together into an electrode film.

In some embodiments, the electrode film porosity of an electrode film as provided herein may be greater than that of an electrode film prepared by conventional processes. In some embodiments, the electrode film porosity of an electrode film as provided herein may be less than that of an electrode film prepared by conventional processes. In some embodiments, the electrode film can have an electrode film porosity (which may be expressed as the percentage of volume of electrode film occupied by pores) of about 5%, about 8%, about 10%, about 12%, about 14%, about 16%, about 18%, about 20%, about 25%, about 30%, about 35% or about 40%, or any range of values therebetween. In some embodiments, the electrode film can have an electrode film porosity (which may be expressed as the percentage of volume of electrode film occupied by pores) of at least about 5%, at least about 8%, at least about 10%, at least about 12%, at least about 14%, at least about 16%, at least about 18%, at least about 20%, at least about 25%, at least about 30%, at least about 35% or at least about 40%, or any range of values therebetween. In some embodiments, the electrode film can have an electrode film porosity (which may be expressed as the percentage of volume of electrode film occupied by pores) of at most about 5%, at least about 8%, at least about at most about 10%, at most about 12%, at most about 14%, at most about 16%, at most about 18%, at most about 20%, at most about 25%, at most about 30%, at most about 35% or at most about 40%, or any range of values therebetween.

In some embodiments, the electrode film density of an electrode film as provided herein may be less than that of an electrode film prepared by conventional processes. In some embodiments, the electrode film density of an electrode film as provided herein may be greater than that of an electrode film prepared by conventional processes. In some embodiments, the electrode film can have an electrode film density of about 0.8 g/cm$^3$, about 1.0 g/cm$^3$, about 1.4 g/cm$^3$, about 1.5 g/cm$^3$, about 1.6 g/cm$^3$, about 1.7 g/cm$^3$, about 1.8 g/cm$^3$, about 1.9 g/cm$^3$, about 2.0 g/cm$^3$, about 2.5 g/cm$^3$, about 3.0 g/cm$^3$, about 3.3 g/cm$^3$, about 3.4 g/cm$^3$, about 3.5 g/cm$^3$, about 3.6 g/cm$^3$, about 3.7 g/cm$^3$, about 3.8 g/cm$^3$, about 3.9 g/cm$^3$, about 4.0 g/cm$^3$, about 4.1 g/cm$^3$ or about 4.2 g/cm$^3$, or any range of values therebetween. In some embodiments, the electrode film can have an electrode film density of at most about 0.8 g/cm$^3$, about 1.0 g/cm$^3$, 1.4 g/cm$^3$, at most about 1.5 g/cm$^3$, at most about 1.6 g/cm$^3$, at most about 1.7 g/cm$^3$, at most about 1.8 g/cm$^3$, at most about 1.9 g/cm$^3$ or at most about 2.0 g/cm$^3$, or any range of values therebetween. In some embodiments, the electrode film can have an electrode film density of at least about 0.8 g/cm$^3$, about 1.0 g/cm$^3$, 1.4 g/cm$^3$, at least about 1.5 g/cm$^3$, at least about 1.6 g/cm$^3$, at least about 1.7 g/cm$^3$, at least about 1.8 g/cm$^3$, at least about 1.9 g/cm$^3$, at least about 2.0 g/cm$^3$, at least about 2.5 g/cm$^3$, at least about 3.0 g/cm$^3$, at least about 3.3 g/cm$^3$, at least about 3.4 g/cm$^3$, at least about 3.5 g/cm$^3$, at least about 3.6 g/cm$^3$, at least about 3.7 g/cm$^3$, at least about 3.8 g/cm$^3$, at least about 3.9 g/cm$^3$, at least about 4.0 g/cm$^3$, at least about 4.1 g/cm$^3$ or at least about 4.2 g/cm$^3$, or any range of values therebetween.

In some embodiments, the electrode formulation may be calendered at a temperature of about 5° C., about 10° C., about 15° C., about 20° C., about 23° C., about 25° C., about 30° C., about 35° C., about 40° C., about 50° C., about 60° C., about 65° C., about 90° C., about 120° C., about 150° C., about 170° C., about 200° C., about 220° C. or about 250° C., or any range of values therebetween. In some embodiments, the electrode formulation may be calendered at about ambient or room temperature.

The electrode films generally comprise one or more active materials, for example, anode active materials or cathode active materials as provided herein. The first electrode film 112 and/or the second electrode film 114 may also include one or more binders as provided herein. The electrode films 112 and/or 114 may be prepared by a process as described herein. The electrode films 112 and/or 114 may be wet or self-supporting dry electrodes as described herein.

In some embodiments, an electrode film, such as one or more of electrode films 112 and/or 114 comprises at least one electrode salt, as described previously herein. In some embodiments, an electrode film also includes at least one active material and at least one binder. The at least one active material can be any active material known in the art. The at least one active material may be a material suitable for use in the anode or cathode of a battery.

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon.

Anode active materials can comprise, for example, an insertion material (such as carbon, graphite (natural, synthetic or blends), hard or amorphous carbons and/or graphene), an alloying/dealloying material (such as silicon, silicon oxide, tin, and/or tin oxide), a metallic element, metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.).

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, an anode electrode film can include about 80 weight %, about 85 weight %, about 90 weight %, about 92 weight %, about 94 weight %, about 95 weight %, about 96 weight %, about 97 weight % or about 98 weight % or about 99 weight % of the at least one active material, or any range of values therebetween. In some embodiments, the anode electrode film comprises up to about 5 weight %, including about 1 weight % to about 3 weight %, of the conductive additive. In some embodiments, the anode electrode film comprises about or up to about 5 weight %, about or up to about 3 weight %, about or up to about 1 weight % or about or up to about 0.5 weight % of the conductive additive, or any range of values therebetween. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode electrode film comprises about or up to about 20 weight %, about or up to about 15 weight %, about or up to about 10 weight %, about or up to about 5 weight %, about or up to about 3 weight %, about or up to about 1.5 weight % or about or up to about 1 weight % of the binder, or any range of values therebetween. In some embodiments, the anode film may not include a conductive additive.

The cathode active material can comprise, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can comprise, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)), an olivine (such as $LiFePO_4$), chalcogenides ($LiTiS_2$), tavorite ($LiFeSO_4F$), silicon, silicon oxide (SiOx), aluminum, tin, tin oxide (SnOx), manganese oxide (MnOx), molybdenum oxide ($MoO_2$), molybdenum disulfide ($MoS_2$), nickel oxide (NiOx), or copper oxide (CuOx). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 mAh/cm². In some embodiments, the cathode film comprising a sulfur or a material including sulfur active material has an electrode film density of 1 g/cm³. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), poly(ethylene oxide) (PEO), polyethylene (PE), polyacrylic acid (PAA), gelatin, other thermoplastics, or any combination thereof.

In some embodiments, a cathode electrode film of a lithium ion battery or hybrid energy storage device can include about 70 weight % to about 98 weight % of the at least one active material, including about 70 weight % to about 92 weight %, or about 70 weight % to about 96 weight %. In some embodiments, a cathode electrode film can comprise about or up to about 70 weight %, about or up to about 90 weight %, about or up to about 92 weight %, about 94 weight %, about 95 weight %, about or up to about 96 weight % or about or up to about 98 weight % of the at least one active material, or any range of values therebetween. In some embodiments, a cathode electrode film of a lithium ion battery or hybrid energy storage device can include about 40 weight % to about 60 weight % of the at least one active material. In some embodiments, the cathode electrode film can comprise up to about 10 weight % of the porous carbon material, including up to about 5 weight %, or about 1 weight % to about 5 weight %. In some embodiments, the cathode electrode film can comprise about or up to about 10 weight %, about or up to about 5 weight %, about or up to about 1 weight % or about or up to about 0.5 weight % of the porous carbon material, or any range of values therebetween. In some embodiments, the cathode electrode film comprises up to about 5 weight %, including about 1 weight % to about 3 weight %, of the conductive additive. In some embodiments, the cathode electrode film comprises about or up to about 10 weight %, 5 weight %, about or up to about 3 weight % or about or up to about 1 weight % of the conductive additive, or any range of values therebetween. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder. In some embodiments, the cathode electrode film comprises about or up to about 20 weight %, about or up to about 15 weight %, about or up to about 10 weight %, about or up to about 5 weight %, about or up to about 3 weight %, about or up to about 1.5 weight % or about or up to about 1 weight % of the binder, or any range of values therebetween.

In some embodiments, the binder material can include one or more fibrillizable binder components. For example, a process for forming an electrode film can include fibrillizing the fibrillizable binder component such that the electrode film comprises fibrillized binder. The binder component may be fibrillized to provide a plurality of fibrils, the fibrils desired mechanical support for one or more other components of the film. The electrode film can comprise a structural matrix, lattice and/or web of fibrils so as to provide support for other components of the electrode film. For example, a matrix, lattice and/or web of fibrils can be formed to provide desired mechanical structure for the electrode film. For example, a cathode and/or an anode of a lithium ion capacitor can include one or more electrode films comprising one or more fibrillized binder components.

Some embodiments include an electrode film, such as of an anode and/or a cathode, having one or more active layers comprising a polymeric binder material. The binder can include polytetrafluoroethylene (PTFE), a polyolefin, polyalkylenes, polyethers, styrene-butadiene, co-polymers of polysiloxanes, a polysiloxane, branched polyethers, polyvinylethers, co-polymers thereof, and/or admixtures thereof. The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder may be a thermoplastic. In some embodiments, the binder comprises a fibrillizable polymer. In certain embodiments, the binder comprises, consists essentially, or consists of PTFE.

In some embodiments, one or more electrode films described herein can be fabricated using a dry fabrication process. As used herein, a dry fabrication process can refer to a process in which no or substantially no solvents are used in the formation of an electrode film. For example, components of the active layer or electrode film, including carbon materials and binders, may comprise dry particles. The dry particles for forming the active layer or electrode film may be combined to provide a particle active film mixture. In some embodiments, the active layer or electrode film may be formed from the particle active film mixture such that weight percentages of the components of the active layer or electrode film and weight percentages of the components of the dry particle active film mixture are substantially the same. In some embodiments, the active layer or electrode film formed from the dry particle active film mixture using the dry fabrication process may be free or substantially free from any processing solvents, and solvent residues resulting therefrom. In some embodiments, the active layer or electrode films are free-standing dry particle electrode films formed using the dry process from the dry particles mixture. A process for forming an active layer or electrode film can include fibrillizing the fibrillizable binder component(s) such that the film comprises fibrillized binder. In further embodiments, a free-standing active layer or electrode film may be formed in the absence of a current collector. In still further embodiments, an active layer or electrode film may comprise a fibrillized polymer matrix such that the film is self-supporting. It is thought that a matrix, lattice, or web of fibrils can be formed to provide mechanical structure to the electrode film.

In some embodiments, an energy storage device electrode film, wherein the electrode film is dry and/or self-supporting film, may provide a high electrode material loading, or a high active material loading (which may be expressed as mass of active material per unit area of electrode film or current collector) of about 12 mg/cm$^2$, about 13 mg/cm$^2$, about 14 mg/cm$^2$, about 15 mg/cm$^2$, about 16 mg/cm$^2$, about 17 mg/cm$^2$, about 18 mg/cm$^2$, about 19 mg/cm$^2$, about 20 mg/cm$^2$, about 21 mg/cm$^2$, about 22 mg/cm$^2$, about 23 mg/cm$^2$, about 24 mg/cm$^2$, about 25 mg/cm$^2$, about 26 mg/cm$^2$, about 27 mg/cm$^2$, about 28 mg/cm$^2$, about 29 mg/cm$^2$, about 30 mg/cm$^2$, about 40 mg/cm$^2$, about 50 mg/cm$^2$, about 60 mg/cm$^2$, about 70 mg/cm$^2$, about 80 mg/cm$^2$, about 90 mg/cm$^2$ or about 100 mg/cm$^2$, or any range of values therebetween. In some embodiments, an energy storage device electrode film, wherein the electrode film is dry and/or self-supporting film, may provide a high electrode material loading, or a high active material loading (which may be expressed as mass of electrode film per unit area of electrode film or current collector) of at least about 12 mg/cm$^2$, at least about 13 mg/cm$^2$, at least about 14 mg/cm$^2$, at least about 15 mg/cm$^2$, at least about 16 mg/cm$^2$, at least about 17 mg/cm$^2$, at least about 18 mg/cm$^2$, at least about 19 mg/cm$^2$, at least about 20 mg/cm$^2$, at least about 21 mg/cm$^2$, at least about 22 mg/cm$^2$, at least about 23 mg/cm$^2$, at least about 24 mg/cm$^2$, at least about 25 mg/cm$^2$, at least about 26 mg/cm$^2$, at least about 27 mg/cm$^2$, at least about 28 mg/cm$^2$, at least about 29 mg/cm$^2$, at least about 30 mg/cm$^2$, at least about 40 mg/cm$^2$, at least about 50 mg/cm$^2$, at least about 60 mg/cm$^2$, at least about 70 mg/cm$^2$, at least about 80 mg/cm$^2$, at least about 90 mg/cm$^2$ or at least about 100 mg/cm$^2$, or any range of values therebetween.

In some embodiments, an energy storage device electrode film, wherein the electrode film is dry and/or self-supporting film, may provide areal capacity (which may be expressed as capacity per unit area of electrode film or current collector) of about, or at least about 3.5 mAh/cm$^2$, about 3.8 mAh/cm$^2$, about 4 mAh/cm$^2$, about 4.3 mAh/cm$^2$, about 4.5 mAh/cm$^2$, about 4.8 mAh/cm$^2$, about 5 mAh/cm$^2$, about 5.5 mAh/cm$^2$, about 6 mAh/cm$^2$, about 6.5 mAh/cm$^2$, about 6.6 mAh/cm$^2$, about 7 mAh/cm$^2$, about 7.5 mAh/cm$^2$, about 8 mAh/cm$^2$ or about 10 mAh/cm$^2$, or any range of values therebetween. In further embodiments, an energy storage device electrode film, wherein the electrode film is dry and/or self-supporting film, may provide areal capacity (which may be expressed as capacity per unit area of electrode film or current collector) of at least about 8 mAh/cm$^2$, for example, about 8 mAh/cm$^2$, about 10 mAh/cm$^2$, about 12 mAh/cm$^2$, about 14 mAh/cm$^2$, about 16 mAh/cm$^2$, about 18 mAh/cm$^2$, about 20 mAh/cm$^2$, or any range of values therebetween. In some embodiments, the areal capacity is charging capacity. In further embodiments, the areal capacity is discharging capacity.

In some embodiments, a dry and/or self-supporting graphite battery anode electrode film may provide areal capacity of about 3.5 mAh/cm², about 4 mAh/cm², about 4.5 mAh/cm², about 5 mAh/cm², about 5.5 mAh/cm², about 6 mAh/cm², about 6.5 mAh/cm², about 7 mAh/cm², about 7.5 mAh/cm², about 8 mAh/cm², about 8.5 mAh/cm², about 9 mAh/cm², about 10 mAh/cm², or any range of values therebetween. In some embodiments, the areal capacity is charging capacity. In further embodiments, the areal capacity is discharging capacity.

In some embodiments, an energy storage device electrode film, wherein the electrode film is dry and/or self-supporting film, may provide a specific capacity (which may be expressed as capacity per mass of active material) of about 150 mAh/g, about 160 mAh/g, about 170 mAh/g, about 175 mAh/g, about 176 mAh/g, about 177 mAh/g, about 179 mAh/g, about 180 mAh/g, about 185 mAh/g, about 190 mAh/g, about 196 mAh/g, about 200 mAh/g, about 250 mAh/g, about 300 mAh/g, about 350 mAh/g, about 354 mAh/g or about 400 mAh/g, or any range of values therebetween. In further embodiments, an energy storage device electrode film, wherein the electrode film is dry and/or self-supporting film, may provide specific capacity (which may be expressed as capacity per mass of electrode film or current collector) of at least about 175 mAh/g or at least about 250 mAh/g, or any range of values therebetween. In some embodiments, the specific capacity is charging capacity. In further embodiments, the specific capacity is discharging capacity. In some embodiments, the electrode may be an anode and/or a cathode. In some embodiment, the specific capacity may be a first charge and/or discharge capacity. In further embodiments, the specific capacity may be a charge and/or discharge capacity measured after the first charge and/or discharge.

In some embodiments, a self-supporting dry electrode film described herein may advantageously exhibit improved performance relative to a typical electrode film. The performance may be, for example, tensile strength, elasticity (extension), bendability, coulombic efficiency, capacity, or conductivity. In some embodiments, an energy storage device electrode film, wherein the electrode film is dry and/or self-supporting film, may provide a coulombic efficiency, for example, a $1^{st}$ cycle coulombic efficiency (which may be expressed as a percent of the discharge capacity divided by the charge capacity) of about, or at least about, 85%, 86%, 87%, about 88%, about 89%, about 90%, about 91%, about 92%, about 93%, about 94% or about 95%, or any range of values therebetween, for example such as 90.1%, 90.5% and 91.9%, or any range of values therebetween.

In some embodiments, an energy storage device electrode film or electrode, wherein the electrode film is or the electrode comprises a dry and/or self-supporting film, may provide a discharge capacity retention percentage (which may be expressed by the discharge capacity at a given rate divided by the discharge capacity measured at C/10) of about or at least about 10%, about or at least about 20%, about or at least about 30%, about or at least about 40%, about or at least about 50%, about or at least about 60%, about or at least about 70%, about or at least about 80%, about or at least about 90%, about or at least about 98%, about or at least about 99%, about or at least about 99.9% or about or at least about 100%, or any range of values therebetween. In some embodiments, the discharge rate of the charge capacity retention percentage is or is at least C/10, C/5, C/3, C/2, 1 C, 1.5 C or 2 C, or any value therebetween.

In some embodiments, an energy storage device electrode film or electrode, wherein the electrode film is or the electrode comprises a dry and/or self-supporting film, may provide a charge capacity production percentage (which may be expressed by the charge capacity measured at a given constant current rate divided by the discharge capacity measured at C/10) of about or at least about 10%, about or at least about 20%, about or at least about, 30%, about or at least about, 40%, about or at least about 50% about or at least about 60%, about or at least about 70%, about or at least about 80%, about or at least about 90%, about or at least about 98%, about or at least about 99%, about or at least about 99.9% or about or at least about 100%, or any range of values therebetween. In some embodiments, the charge rate of the charge capacity production percentage is or is at least C/10, C/5, C/3, C/2, 1 C, 1.5 C or 2 C, or any value therebetween.

In some embodiments, an energy storage device electrode film, wherein the electrode film is dry and/or self-supporting film, may provide a specific energy density or gravimetric energy density (which may be expressed as energy per mass of electrode film) of about 200 Wh/kg, about 210 Wh/kg, about 220 Wh/kg, about 230 Wh/kg, about 240 Wh/kg, about 250 Wh/kg, about 260 Wh/kg, about 270 Wh/kg, about 280 Wh/kg, about 290 Wh/kg, about 300 Wh/kg, about 400 Wh/kg, about 500 Wh/kg, about 600 Wh/kg, about 650 Wh/kg, about 700 Wh/kg, about 750 Wh/kg, about 800 Wh/kg, about 825 Wh/kg, about 850 Wh/kg or about 900 Wh/kg, or any range of values therebetween.

In some embodiments, an energy storage device electrode film, wherein the electrode film is dry and/or self-supporting film, may provide an energy density or volumetric energy density (which may be expressed as energy per unit volume of the final or in situ electrode film) of about 550 Wh/L, about 600 Wh/L, about 630 Wh/L, about 650 Wh/L, about 680 Wh/L, about 700 Wh/L, about 750 Wh/L, about 850 Wh/L, about 950 Wh/L, about 1100 Wh/L, about 1400 Wh/L, about 1425 Wh/L, about 1450 Wh/L, about 1475 Wh/L, about 1500 Wh/L, about 1525 Wh/L or about 1550 Wh/L, or any range of values therebetween.

Figure 2:
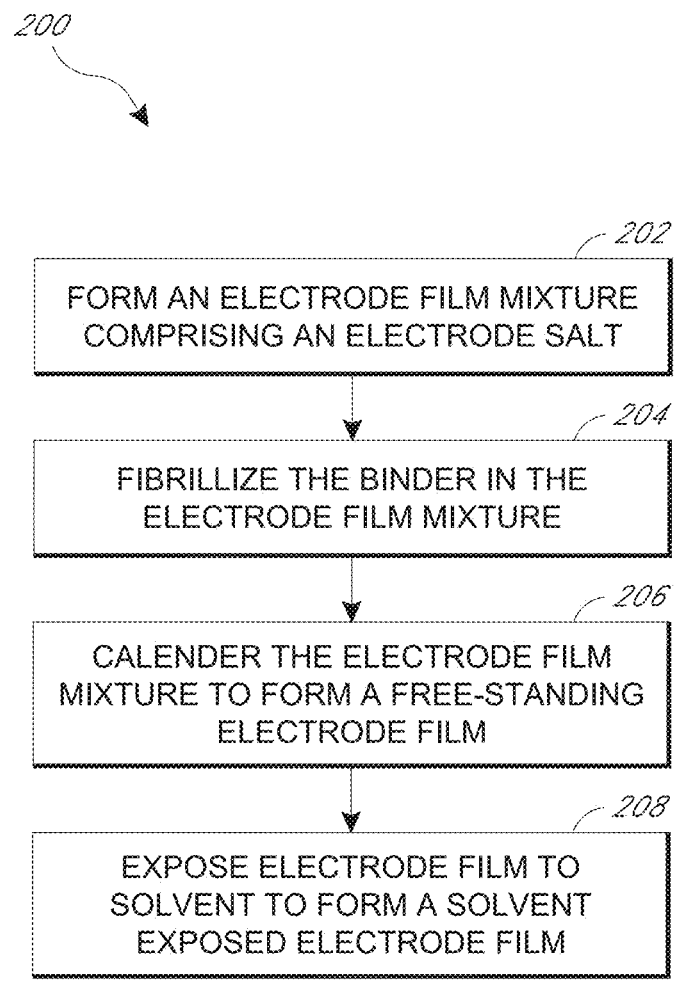
FIG. 2 is a process flow diagram showing an example of a process for fabricating an electrode film from an electrode film mixture comprising an electrode salt.

FIG. 2 is a process flow diagram showing an example of a process 200 for fabricating an electrode film, according to some embodiments. In some embodiments, the process 200 for fabricating an electrode film is a dry process, where no liquids or solvents are used such that the resulting electrode film is free or substantially free of any liquids, solvents, and resulting residues. In block 202, an electrode film mixture is formed comprising an electrode salt. In some embodiments, the electrode film mixture may further comprise an electrode active material. In some embodiments, the electrode film mixture may further comprise carbon particles. In some embodiments, the electrode film mixture may further comprise a binder material. Optionally one or more electrical conductivity promoting additives can be combined, for example, graphene, graphite or carbon nanotubes. In some embodiments, the electrode film mixture is a dry particles mixture. In some embodiments, the binder material comprises one or more fibrillizable polymers, such as polytetrafluoroethylene (PTFE) and ultra-high molecular weight polyethylene (UHMWPE). In some embodiments, the binder material consists or consists essentially of one type of polymer, such as PTFE. In some embodiments, the electrical conductivity promoting additive can be one or more conductive carbons. For example, the conductive carbon can include one or more types of carbon black and/or graphite described herein.

In some embodiments, a continuous mixing process can be used. In such embodiments, the duration of blending and/or milling can be inversely related to the feed rate. Generally, the feed rate is dependent on the milling machinery, and can be adjusted based on the machine operating parameters in view of guidance provided herein. In further embodiments, equipment with larger channels can be used to increase the duration of blending and/or milling. When a batch blending and/or milling process is used, the duration can be increased simply by blending and/or milling for a longer time and/or at higher RPMs.

In block 204, the electrode film mixture can be fibrillized to form fibrils from the binder material. The fibrillization process can be performed with reduced speed and/or increased process pressure. The reduced speed and/or increased process pressure may facilitate increased formation of fibrils such that a reduced quantity of binder material can be used to form the electrode film having the desired resistance to a tensile, shear, compressive, and/or twisting stress. As described herein, in some embodiments, the fibrillization process can be mechanical shearing process, for example, comprising a blending and/or a milling process. In some embodiments, the speed with which particles of the electrode film mixture are cycled through the blender and/or mill may be reduced during the fibrillization process. In some embodiments, the process pressure within the blender and/or mill during the fibrillization process may be increased. In some embodiments, the forming step of block 202 and fibrillization step of block 204 may be one or substantially one continuous step. The reduced speed and/or increased process pressure can allow an electrode film with a sufficiently great strength to be manufactured, for example such as a free-standing electrode film, either through a single, higher pressure calendering process (in a single step), or through multiple calendering steps, for example, where the film is unwound, and subsequently re-calendered, one or more times after an initial calendering step.

In block 206, the electrode film mixture can be calendered in a calender apparatus to form a free-standing fibrillized electrode film. A calender apparatus is well known in the art, and generally includes a pair of calender rolls (possessing either mechanically fixed gap or a hydraulic or pneumatic pressure fixed gap) between which raw material, such as an electrode film mixture is fed, to form an electrode film. In some embodiments, an electrode film can be formed in a first calendering step, without additional calendering steps, to form a film at a desired minimum thickness, as described further herein. In some embodiments, the calendered mixture forms a free-standing dry particle film free or substantially free from any liquids, solvents, and resulting residue therefrom. In some embodiments, the electrode film is an anode electrode film. In some embodiments, the electrode film is a cathode electrode film.

In block 208, the electrode film is exposed to a solvent to form a solvent exposed electrode film. Exposure of the electrode film to solvent may cause the electrode salt to be extracted. In some embodiments, the extracted electrode salt may function as the ionic components of electrolyte system of an energy storage device. In some embodiments, the extraction of the electrode salt may result in an increase in pore volume and a decrease in the overall density of the electrode film. In some embodiments, the electrode film is exposed to a solvent within an energy storage device container, such as the energy storage device container 120 described in FIG. 1. In some embodiments, the electrode film is exposed to solvent external from an energy storage device container, for example the electrode film may be exposed to solvent within an electrolyte bath. In some embodiments, the electrode film may be exposed to a solvent as a free-standing electrode film or as part of an electrode further comprising a current collector. In some embodiments, the electrode film may be exposed to an electrical current concurrently while exposed to the solvent. In some embodiments, the electrode film may be pre-lithiated concurrently while exposed to the solvent. In some embodiments, such as in the process of producing a solid-state electrode film, block 208 is not performed, thereby allowing the electrode salt to remain within the electrode film. In such an embodiment, the electrode salt can function as a solid electrolyte in a solid-state energy storage device.

In some embodiments, the solvent exposed electrode film has a porosity ranging from 1% to 50% of the free void volume in the electrode. In some embodiments, the solvent exposed electrode film has a porosity ranging from 1% to 10% of the free void volume in the electrode. In some embodiments, the solvent exposed electrode film has a film thickness of 20 μm to 300 μm. In some embodiments, the solvent exposed electrode film has a film thickness of 50 μm to 150 μm.

In another instance, a dry electrode or dry electrode film may comprise a dry foam. In some embodiments, the foam may be a metallic foam. In some embodiment, the foam may be a ceramic foam. Whereas some conventional energy storage devices employ high-density aluminum as, for example, a current collector or in combination with the current collector and other electrode film materials, the relatively low contact area between the surfaces of the electrode film and current collector may result in poor electron transport, which may result in insufficient rate capabilities. However, the use of foams, such as metal foams, as current collectors may significantly enhance the energy storage device power by utilizing a three-dimensionally interconnected porous structure that encapsulates the active material and increases the contact area between the foam current collector and the active material, thereby may increase the rate capability of the energy storage device. In addition, the use of foams, such as ceramic foams, may provide a source of ions and act as an ion conductor, for example a foam comprising lithium lanthanum zirconate (LLZO) may conduct lithium ions. Furthermore, encapsulating an active material within a foam, such as metal foams and ceramic foams, may decrease or eliminate the need to include inactive components, such as binders, in the electrode mixture. The minimization or elimination of inactive components may result in an increase in energy density of the electrochemical device. Moreover, encapsulation of active material within a foam may alleviate at least some of the electrode volume strain associated with the charging/discharging process. As an example, volume expansion and contraction of conventional lithium ion battery electrodes during cycling contributes to shortened cycle life. In some embodiments, an electrode film mixture or a free-standing electrode film may be encapsulated by the foam. In some embodiments, an electrode film mixture or a free-standing electrode film may be pressed to the foam. In some embodiments, an electrode film mixture or a free-standing electrode film may be calendered to the foam. In some embodiments, a foam may be commercially purchased.

In some embodiments, the foam functions as the housing for the active material. In some embodiments, the foam functions as both the housing for the active material and provides sufficient conductivity such that a current collector does not need to be used, even if an additional current collector is used. Such a foam-active material composite is characterized as a dry electrode for the purposes of this disclosure. An example of such a composite material is an active material encapsulated by a metal foam.

In some embodiments, the foam functions as the housing for the active material, but does not provide sufficient conductivity such that a current collector is required. Such a foam-active material composite is characterized as a dry electrode film for the purposes of this disclosure. An example of such a composite material is an active material encapsulated by a ceramic foam, due to the electro-insulating nature typically found in ceramics. Therefore, in some embodiments, a foam-active material composite may be laminated to a current collector. In some embodiments, the current collector is a metal current collector. In some embodiments, lamination may be performed by calendering. In some embodiments, calendering may be performed using a 2-roll calender press.

Figure 3:
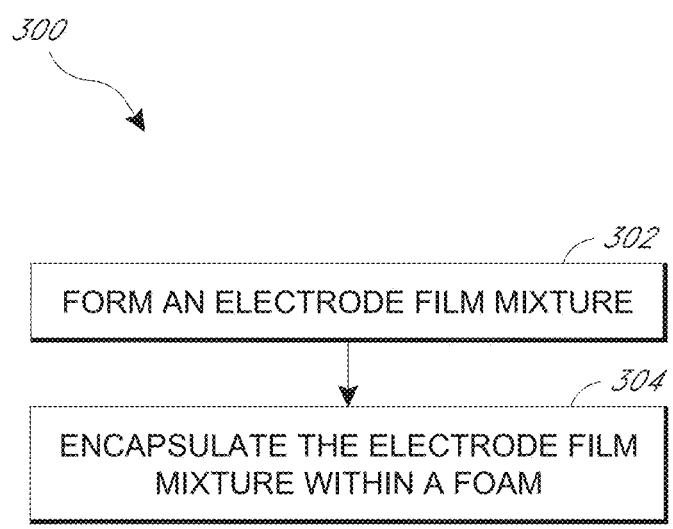
FIG. 3 is a process flow diagram showing an example of a process for encapsulating an electrode film mixture by a foam.

FIG. 3 is a process flow diagram showing an example of a process 300 for encapsulating an electrode film mixture within a foam. In some embodiments, the electrode film mixture in process 300 may be a cathode or an anode electrode film mixture as described previously herein. In some embodiments, the electrode film mixture in process 300 is a cathode electrode film mixture. In some embodiments, the process 300 for encapsulating an electrode film mixture within a foam is a dry process, where no liquids or solvents are used such that the resulting electrode film is free or substantially free of any liquids, solvents, and resulting residues. In block 302, an electrode film mixture is formed. In some embodiments, the electrode film mixture may comprise a lithium ion-conducting ceramic material. In some embodiments, the lithium ion-conducting ceramic material may be selected from at least one of lithium lanthanum zirconate (LLZO), lithium nitride, lithium aluminum germanium phosphate (LAGP), lithium zinc germanium oxide (LISICON), lithium germanium phosphorous sulfide (Thio-LISICON), lithium aluminum titanium phosphate (LATP), and lithium sulfide. In some embodiments, the amount of lithium ion-conducting ceramic material in the electrode film mixture may be or be about 0.5 wt %, 1 wt %, 5 wt %, 10 wt %, 20 wt %, 30 wt %, 40 wt %, 50 wt % or 60 wt %, or any range of values therebetween. For example, in some embodiments, the amount of lithium ion-conducting ceramic material in the electrode film mixture may range from about 1 wt % to about 50 wt %. In some embodiments, the electrode film mixture may further comprise other materials as described herein, such as, for example, an active material, carbon particles, and/or binder material. In some embodiments, the active material may be selected from at least one metal oxide, such as a lithium metal oxide. In some embodiments, the lithium metal oxide may be selected from at least one of lithium cobalt oxide, lithium manganese oxide, lithium iron phosphate, lithium nickel manganese cobalt oxide, and lithium nickel cobalt aluminum oxide. Optionally one or more electrical conductivity promoting additives can be combined. In some embodiments, the electrode film mixture is a dry particle mixture.

In some embodiments, the electrode film mixture may be free of binder material, substantially free of binder material, or the amount of binder material is reduced relative to electrodes absent of foams. In some embodiments, an electrode film mixture contains an about 0%, 0.5%, 1%, 1.5% or 2%, or any range of values there between, reduction of the amount of binder material relative to electrodes absent of foams. In some embodiments, the binder material comprises one or more fibrillizable polymers, such as polytetrafluoroethylene (PTFE) and ultra-high molecular weight polyethylene (UHMWPE). In some embodiments, the binder material consists or consists essentially of one type of polymer, such as PTFE. In some embodiments, the electrical conductivity promoting additive can be one or more conductive carbons. For example, the conductive carbon can include one or more types of carbon black and/or graphite described herein.

In block 304, the electrode film mixture is encapsulated by a foam. In some embodiments, the foam is a metal foam or a ceramic foam. In some embodiments, the metal foam is selected from at least one of aluminum foam, nickel foam, titanium foam, silver foam, copper foam, cobalt foam, and steel foam. In some embodiments, the ceramic foam is selected from at least one of aluminum oxide foam, silicon dioxide foam, silicon carbide foam, boron nitride foam, and boron carbide foam. In some embodiments, the foam comprises a porous structure. In some embodiments, the foam has a relative density between 0.03-0.3, where the relative density is defined as the ratio of the foam density to that of the non-porous reference material, such as a non-porous metal or a non-porous ceramic. In some embodiments, a foam has a density of about, or at most about, 0.1 g/cm$^3$, 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.5 g/cm$^3$ or 2.0 g/cm$^3$, or any values therebetween. In some embodiments, a foam has a porosity of about, or at least about, 25%, 28%, 30%, 40%, 50%, 60%, 70%, 80%, 85%, 90%, 95% or 98%, or any range of values therebetween. In some embodiments, a foam has a primary pore size or pore diameters of about, at most about, or at least about, 0.1 mm, 0.2 mm, 0.3 mm, 0.4 mm, 0.5 mm, 0.6 mm, 0.7 mm, 0.8 mm, 0.9 mm, 1 mm, 1.5 mm, 1.6 mm, 2 mm, 3 mm, 4 mm, 5 mm, 6 mm, 7 mm, 8 mm, 9 mm, 10 mm or 15 mm, or any range of values therebetween. In some embodiments, the foam may have open micropores. In some embodiments, the foam may have closed micropores. In some embodiments, the foam may have open macropores. In some embodiments, the foam may have closed macropores. In some embodiments, a non-porous reference material has a density of about, or at least about, 1 g/cm$^3$, 1.5 g/cm$^3$, 2 g/cm$^3$, 3 g/cm$^3$, 4 g/cm$^3$, 5 g/cm$^3$ or 10 g/cm$^3$, or any range of values therebetween.

Figure 4:
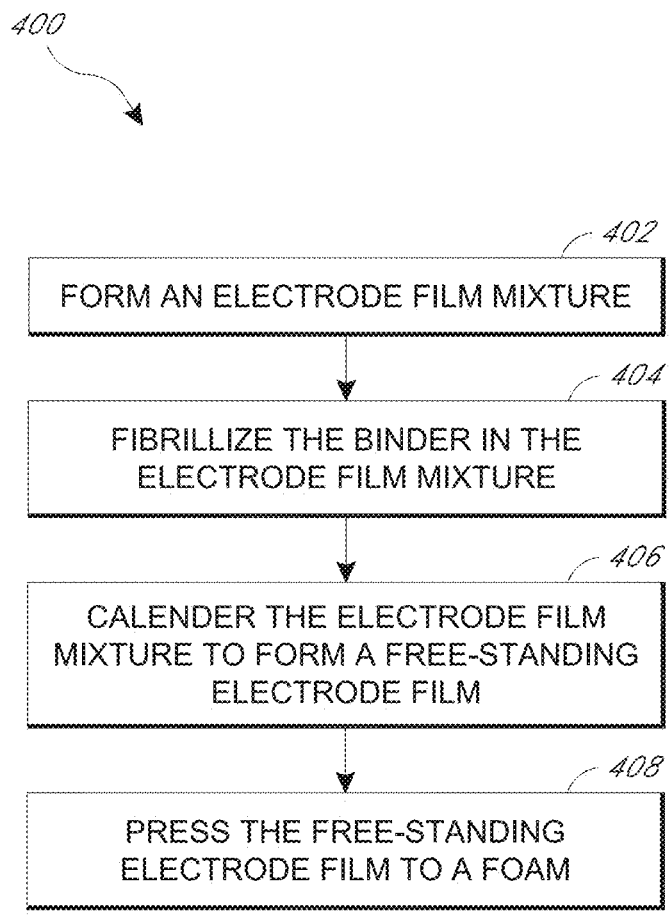
FIG. 4 is a process flow diagram showing an example of a process for pressing a free-standing electrode film to a foam.

FIG. 4 is a process flow diagram showing an example of a process 400 for pressing a free-standing electrode film to a foam. In some embodiments, the free-standing electrode film in process 400 may be a cathode or an anode free-standing electrode film as previously described herein. In some embodiments, the free-standing electrode film in process 400 is a cathode free-standing electrode film. In block 402, an electrode film mixture is formed. In some embodiments, the electrode film mixture is produced by any method or with any composition previously described. In some embodiments, the free-standing electrode film is composed of an active material and binder. In some embodiments, the free-standing electrode film further comprises conductive carbon. In some embodiments, the free-standing electrode film further comprises conductive carbon and a lithium ion-conducting ceramic, as previously described. In some embodiments, the binder may be selected from at least one of poly(tetrafluoroethylene) (PTFE), polyvinylidene difluoride (PVDF), and carboxymethyl cellulose (CMC). In some embodiments, the total amount of binder in the film may be or be about 0.5 wt. %, 1 wt. %, 5 wt. %, 10 wt. %, 15 wt. % or 20 wt. %, or any range of values therebetween. For Example, in some embodiments, the total amount of binder in the film ranges from about 1-15 wt. %. In some embodiments, the total amount of lithium ion-conducting ceramic in the film may be or be about 0.5 wt. %, 1 wt. %, 5 wt. %, 10 wt. %, 20 wt. %, 30 wt. %, 40 wt. %, 50 wt. % or 60 wt. %, or any range of values therebetween. For example, in some embodiments, the total amount of lithium ion-conducting ceramic in the film ranges from about 1 wt. % to about 50 wt. %.

In block 404, the binder in the electrode film mixture is fibrillized. In some embodiments, fibrillization may be performed by any method previously described, such as the process described in block 204 of FIG. 2. In block, 406, the electrode film mixture is calendered to form a free-standing electrode film. In some embodiments, the free-standing electrode film may be produced by any method previously described. Without being bound by theory, in some embodiments, after application of a sufficiently high shear and/or pressure force to the electrode film mixture, particles with sufficiently small sizes, provided or formed within the electrode film mixture, may become attracted by their surface free energies to provide a supporting matrix within which other particles may become supported. Without being bound by theory, it is theorized that under sufficient shear force and/or pressure, particles within the electrode film mixture described herein may be caused to approach one another to separation distances at which generally attractive forces (such as London-van der Waals forces), that result from surface free energies inherent to the particles, attractively interact with sufficient force to hold the particles together thereby allowing formation of a continuous, self-supporting film. In block 408, the free-standing electrode film is pressed and laminated to a foam. In some embodiments, the free-standing electrode film is pressed to the foam by calendering. In some embodiments, calendering may be performed using a 2-roll calender press. In some embodiments, the foam may be produced by any method or with any composition previously described. In some embodiments, the foam is a metal foam. In some embodiments, the foam is a ceramic foam. In some embodiments, the electrode film-foam composite may be laminated to a current collector. In some embodiments, the film-foam composite may act as an electrode without the addition of a current collector.

In some embodiments, once a dry cell is constructed using methods known in the art such as winding or stacking of electrodes interleave with a separator layer, the selected solvent or combination of solvents can be added to the dry cell for immediate use. In some embodiments, such as where long calender life storage is essential, the produced dry cell may be stored in a dry state with minimal degradation. In some embodiments, such as in solid-state energy storage devices, the produced dry cell may be ready for immediate use without the addition of a solvent or combination of solvents.

It will be understood that although the electrodes and energy storage devices herein may be described within a context of lithium ion capacitors and batteries, the embodiments can be implemented with any of a number of energy storage devices and systems, such as one or more batteries, capacitors, capacitor-battery hybrids, fuel cells, solid state energy storage devices, combinations thereof, and the like, with or without lithium.

Exposure of Electrode Film to Solvent within an Energy Storage Device

In some embodiments, a cell of an energy storage device containing an electrode film comprising an electrode salt is charged or filled with one or more electrolyte solvents in order to extract and dissolve the electrode salt from the electrode film. The dissolved electrode salt may function as the ionic component or solute of the electrolyte system in the energy storage device. In addition, extracting the electrode salt from the electrode film may result in a solvent exposed electrode film with an increased pore volume and decrease in overall electrode film density.

The selection of salts, solvents and processing conditions can be selected in order to achieve intended functions. In some embodiments, electrode salts and solvents are selected to be compatible with each other. In some embodiments, an aqueous solvent miscible electrode salt and an aqueous solvent are selected. In some embodiments, a non-aqueous solvent miscible electrode salt and non-aqueous solvent are selected. In some embodiments, a moisture sensitive electrode salt is selected. In some embodiments, an electrode salt that is stabile under normal device processing conditions is selected. In some embodiments, an electrode salt that does not degrade under normal device operation conditions is selected.

In some embodiments, the electrode salt is selected from at least one of $LiPF_6$, $LiBF_4$, LiBOB, $LiN(SO_2CF_3)_2$, $LiOSO_2CF_3$, $LiNO_3$, lithium acetates, lithium halides, tetra-alkylammonium tetrafluoroborates and tetra-alkylammonium hexafluorophosphates.

In some embodiments, the solvent is selected from at least one of carbonates, esters, amides, ethers, alcohols, sulfones and water. In some embodiments, the solvent is a volatile solvent. In some embodiments, the solvent is a highly volatile solvent, wherein the solvent is gaseous at ambient temperature and pressure. In some embodiments, the highly volatile solvent is a liquid under pressures above 1 atm. In some embodiments, the highly volatile solvent is a liquid below 20° C. In some embodiments, the highly volatile solvent has a boiling point at ambient pressure of about, or at most about, 10° C., 20° C., 30° C., 40° C., 50° C., 57° C., 60° C., 66° C., 70° C., 80° C., 90° C., 91° C. or 95° C., or any range of values therebetween. In some embodiments, the highly volatile solvent may be dimethyl carbonate, tetrahydrofuran (THF), methyl acetate, or mixtures thereof. In some embodiments, highly volatile solvents produce solvent exposed electrode films with increased porosity relative to electrode films exposed to non-volatile solvents. In some embodiments, highly volatile solvents allow for energy storage devices to operate at low environmental temperatures, such as about, or at least about, −150° C., −110° C., −108° C., −100° C., −98° C., −75° C., −50° C., −25° C., 0° C., 2° C., 4° C., 5° C. or 10° C., or any values therebetween, due to the fact that highly volatile solvents have lower melting points relative to non-volatile solvents and will remain liquid at lower temperatures. In some embodiments, highly volatile solvents allow for higher concentrations of electrolyte salts to be dissolved relative to non-volatile solvents.

In some embodiments, the solvent is added to a dry energy storage device comprising a dry electrode film. In some embodiments, a total amount of electrode salt is selected to provide an electrolyte in the energy storage device with a target molarity. In some embodiments, the total amount of salt may be metered into a positive electrode. In some embodiments, the total amount of salt may be metered into a negative electrode. In some embodiments, the total amount of salt may be metered evenly in the positive and negative electrodes. In some embodiments, the total amount of salt may be metered in any uneven amount into the positive and negative electrodes, for example, such as 10:90, 25:75, 45:55, 55:45, 75:25 and 90:10, or any range between any of these values.

In some embodiments, the electrode film is a cathode electrode film.

Wash of an Electrode Film

In some embodiments, an electrode film comprising an electrode salt is washed with an electrolyte solvent or solvents apart from the energy storage device container in order to extract and dissolve the electrode salt from the electrode film. Extracting the electrode salt from the electrode film may result in a solvent exposed electrode film with an increased pore volume, and a decrease in overall electrode film density. Furthermore, in some embodiments, the use of electrode salt materials within dry electrode films may be used to pre-lithiate the electrode film concurrently with the washing process. In other embodiments, the washed electrode film may be pre-lithiated after the washing process, for example pre-lithiation of the electrode film may occur in a separate pre-lithiation apparatus or within the energy storage device container.

Figure 5:
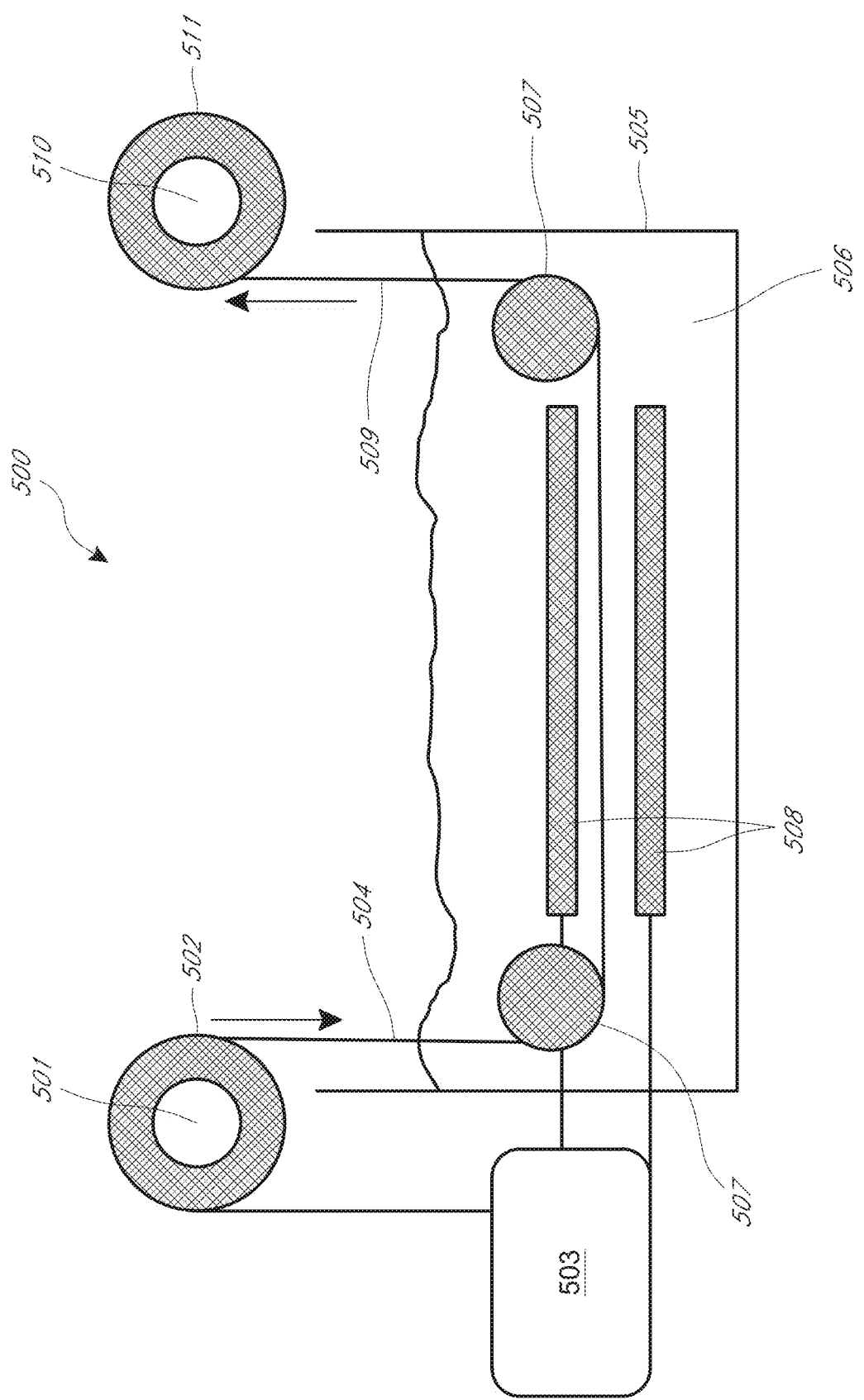
FIG. 5 is an apparatus and process used to pre-lithiate an electrode film comprising an electrode salt.

FIG. 5 illustrates a schematic of one embodiment of a wash apparatus 500 concurrently utilizing a pre-lithiation process of an electrode film comprising an electrode salt. An electrode film roll 501 comprising a dry electrode salt is placed on an unwind 502 and is negatively polarized using a power supply 503. The dry electrode film roll 501 may be prepared by any of the methods previously described. The dry electrode film roll 501 is rolled out and unwound into an electrode film sheet 504 and immersed into a solvent bath 505 containing a solvent 506. The electrode film sheet 504 is suspended in the solvent 506 between rollers 507, and between at least one pair of counter electrodes 508 that are positively polarized by the power supply 503. As the electrode film sheet 504 is suspended in the solvent 506, the electrode salt from the electrode film sheet 504 dissolves into the solvent 506. Concurrently, the negative polarization of the electrode film sheet 504 and the positive polarization of the pair of counter electrodes 508 electrochemically cause the lithium component of the electrode salt to prelithiate the electrode film sheet 504. The electrode film sheet exits the solvent 506 and solvent bath 505 as a lithiated electrode film 509. The lithiated electrode film 509 is collected and rerolled at the rewind 510 into a rewound lithiated electrode 511. In some embodiment not shown, the lithiated electrode film 509 may be rinsed in a rinse bath prior to being rewound into a rewound lithiated electrode 511. In some embodiment not shown, the lithiated electrode film 509 may be dried to remove the solvent 506 from the solvent bath 505 or the rinse bath prior to being rewound into a rewound lithiated electrode 511. In some embodiments, prelithiation of the electrode film sheet 504 does not occur, and as such the power supply 503 and the pair of counter electrodes 508 are not utilized or are absent from the apparatus 500.

In some embodiments, the solvent of the solvent bath is dimethyl carbonate. In some embodiments, the solvent does not comprise an electrolyte salt. In some embodiments, the solvent further comprises an electrolyte salt. In some embodiments, the electrolyte salt is lithium fluoride. In some embodiments, the electrolyte salt of the solvent is the same as the electrode salt of the electrode film or electrode, as described previously.

In some embodiments, the dry electrode may be a cathode or an anode electrode. In some embodiments, the dry electrode is an anode electrode. In some embodiments, the dry electrode comprises graphite. In some embodiments, the dry electrode comprises silicon. In some embodiments, the counter electrode is a glassy carbon electrode.

In some embodiments, the lithiated electrode film is substantially free of or is free of electrode salt. In some embodiments, the rewound lithiated electrode film is substantially free of or free of electrode salt. In some embodiments, the lithiated electrode film comprises pores.

In some embodiments, an energy storage device comprising the lithiated electrode film further comprises added electrolyte salts. In some embodiments, an energy storage device comprises an anode comprising a lithiated electrode film previously described, and a cathode comprising a cathode film previously described previously herein, such that the total amount of salt from the porous electrode can be metered into the anode. In some embodiments, the total amount of salt may be metered evenly in the positive and negative electrodes. In some embodiments, the total amount of salt may be metered in any uneven amount into the positive and negative electrodes, for example, such as 10:90, 25:75, 45:55, 55:45, 75:25 and 90:10, or any range between any of these values.

Solid State Electrode

The electrode processing method described here involves blending a dry solid electrolyte additive with a dry active material in a dry process to produce a dry electrode film, previously described herein. An intimate mixture of a solid electrolyte salt or solid electrolyte additive with an active material in this nature may help to reduce the electrolyte-active material interfacial resistance that is known to be very high for typical solid state lithium ion batteries. A dry electrode process, relative to a wet electrode process, also may provide a more intimate contact at the solid electrolyte-active material interface and reduce the solvent induced degradation of the moisture sensitive solid electrolyte. In some embodiments, there is no solvent addition or removal. Furthermore, since drying of solvent is not required in the dry electrode coating process, a densely packed particle matrix may be fabricated for higher ionic and electronic contact to the active materials, leading to an overall lower electrode resistance.

In some embodiments, a solid state electrode is formed from an electrolyte-electrode powder by similar methods to those previously described herein. In some embodiments, an electrolyte-electrode powder is prepared by blending an active material with a solid electrolyte additive. In some embodiments, the electrolyte-electrode powder further comprises a binder. In some embodiments, the binder is at least one of poly(ethyleneoxide), poly(tetrafluoroethylene), poly (vinylidenedifluoride) and carboxymethylcellulose. In some embodiments, the binder is a fibrillizable binder. In some embodiments, the molecular weight of the binder ranges from about 1000 g/mole to about $5 \times 10^6$ g/mole. In some embodiments, the binder may comprise polymers with a combination or range of molecular weights. In some embodiments, the binder comprises about 2-40 wt. % of the electrolyte-electrode powder. In some embodiments, the binder comprises about 1-15 wt. % of the electrolyte-electrode powder.

In some embodiments, the active material is at least one of lithium cobalt oxide, lithium manganese oxide, lithium iron phosphate, lithium nickel manganese cobalt oxide, lithium nickel cobalt aluminum oxide, and $LiNi_{1-x-y}Co_xMn_yO_2$ (NCM), such as NMC 811. In some embodiments, the cathode active material comprises 40-90 wt. % of the electrolyte-electrode powder.

In some embodiments, the solid electrolyte additive is a lithium salt. In some embodiments, the lithium salt is selected from at least one of lithium hexafluorophosphate, lithium bis(trifluoromethanesulfonyl)imide, lithium tetrafluoroborate, lithium trifluoromethanesulfonate and lithium perchlorate. In some embodiments, the solid electrolyte additive is a garnet ion conductor, for example, $Li_5La_3Ta_2O_{12}$ and $Li_3N$. In some embodiments, the solid electrolyte additive is a sulfur based ion conductor, for example $Li_2S$—$P_2S_5$ and $Li_2S$—$P_2S_5$—$Li_3PO_4$. In some embodiments, the solid electrolyte additive is another compound with high ionic conductivity, for example $Li_{0.5}La_{0.5}TiO_3$ (LLTO) and/or $Li_7La_3Zr_2O_{12}$ (LLZO). In some embodiments, the solid electrolyte additive is a Lithium Super Ionic Conductor (LISCON), for example the LISCON may have a molecular formula of $Li_{(2+2x)}Zn_{(1-x)}GeO_4$. In some embodiments, lithium salt comprises 1-10 wt. % of the electrolyte-electrode powder.

In some embodiments, the dry solid state electrode film has a porosity ranging from about 1% to about 50% of the free void volume in the electrode film. In some embodiments, the dry solid state electrode film has a porosity ranging from about 1% to about 10% of the free void volume in the electrode film. In some embodiments, the dry solid state electrode film has a film thickness of about 20 μm to about 300 μm. In some embodiments, the dry solid state electrode film has a film thickness of about 50 μm to about 150 μm. In some embodiments, the porosity, density and/or thickness of dry solid state electrode film may be any other values described throughout the disclosure.

An example dry processing procedure for preparing a solid state electrode is as follows. A cathode active material of NMC811 is dry mixed with LLZO in a ratio of about 7:2 (NMC811:LLZO) parts by weight. To the mixed electrolyte-electrode powder of active material-LLZO powder, conductive carbon is added in about 0.5 parts by weight ratio and further homogenized. A binder of about 0.5 parts by weight is added to the mixture and mixed with high sheared force to yield a predisposed powder formulation for free-standing electrode film fabrication. The predisposed powder formulation is pressed into a free-standing solid-state electrode film using a 2-roll calender press. The film is then laminated onto a metal current collector using a 2-roll calender press to afford a dry processed solid-state cathode.

In some embodiments, a solid-state battery is prepared by stacking the dry processed solid-state cathode with a lithium metal electrode interposed by a thin solid-state electrolyte layer in between. The thin solid-state electrolyte layer can be pre-coated onto the lithium metal or pre-coated onto the solid-state cathode using the solid-state electrolyte composition used in the cathode or an alternative solid-state electrolyte with similar ionic conductivity and similar operating voltage stability. In some embodiments, the solid-state battery does not comprise a liquid solvent.

Solid State Polymer Electrolyte

The dry powder mixing and film calendering process, as previously described, may also be utilized to fabricate a composite polymer film for use as an ion conducting solid state separator or electrolyte in solid state energy storage devices, such as solid state lithium metal batteries. Dry processing of the solid state polymer electrolyte membrane may offer numerous benefits over typical wet solvent cast preparations, such as an environmentally friendly manufacturing process that minimizes generation of toxic solvent waste, the process does not include an additional and time consuming film drying step to evaporate solvent or residual water from the membrane, the ability to prepare a thinner polymer membrane, higher electrochemical performance due to the absence of residual organic solvents in the polymer electrolyte film, and enabling a continuous roll-to-roll fabrication process of both the polymer membrane and the complete cell assembly. Dry processed and solvent-free composite polymer films using dry powder mixing and film calendering processes are described, and the physical and electrochemical properties of such films are demonstrated.

In some embodiments, the composite solid polymer electrolyte (SPE) comprises at least one ion conducting polymer. In some embodiments, the SPE comprises at least one lithium source. In some embodiments, the SPE comprises at least one supporting polymer binder. In some embodiments, the SPE comprises at least one filler. In some embodiments, the SPE comprises at least one ion conducting medium. In some embodiments, the SPE comprises at least one ion conducting polymer and at least one lithium source. In some embodiments, the SPE comprises at least one ion conducting polymer, at least one lithium source and at least one supporting polymer. In some embodiments, the SPE comprises at least one ion conducting polymer, at least one lithium source, at least one supporting polymer and at least one filler. In some embodiments, the SPE comprises at least one ion conducting polymer, at least one lithium source, at least one supporting polymer, at least one filler and at least one ion conducting medium.

In some embodiments, the ion conducting polymer is selected from at least one of polyethylene oxide (PEO), polyvinylidene fluoride (PVDF), poly(methylene oxide), polyoxymethylene, poly(vinyl alcohol) (PVA), poly(vinyl pyrrolidone) (PVP), poly(methyl methacrylate), poly(vinyl acetate), poly(vinylchloride), poly(vinyl acetate), poly(oxyethylene)$_9$methacrylate, poly(ethylene oxide) methyl ether methacrylate, and poly(propylenimine).

In some embodiments, the lithium source is selected from at least one of lithium perchlorate ($LiClO_4$), lithium tetrafluoroborate ($LiBF_4$), lithium hexafluorophosphate ($LiPF_6$), lithium bis(trifluoromethane sulfonimide) (LiTFSI) ($Li(C_2F_5SO_2)_2N$), lithium bis(oxalato)borate ($LiB(C_2O_4)_2$), lithium trifluoromethanesulfonate ($LiCF_3SO_3$), lithium bis(pentafluoroethanesulfonyl)imide ($C_4F_{10}LiNO_4S_2$), lithium bis(fluorosulfonyl)imide ($F_2LiNO_4S_2$), lithium difluoro(oxalato) borate ($LiBF_2(C_2O_4)$), lithium difluorophosphate ($F_2LiO_2P$), lithium trifluorochloroborate ($LiBF_3Cl$), lithium hexafluoroarsenate ($LiAsF_6$), $Li_{6.4}La_3Zr_{1.4}Ta_{0.6}O_{12}$, $Li_7La_3Zr_2O_{12}$, $Li_{10}SnP_2S_{12}$, $Li_3xLa_{2/3x}TiO_3$, $Li_{0.8}La_{0.6}Zr_2(PO_4)_3$, $Li_{1+x}Ti_{2-x}Al_x(PO_4)_3$, $Li_{1+x+y}Ti_{2-x}Al_xSi_y(PO_4)_{3-y}$, and $LiTi_xZr_{2-x}(PO_4)_3$. In some embodiments, the lithium source may be a lithium salt, such as those described herein, or others.

In some embodiments, the supporting polymer binder is selected from at least one of polyethylene (PE) and polytetrafluoroethylene (PTFE).

In some embodiments, the filler is a ceramic filler. In some embodiments, the ceramic filler is selected from at least one of titanium oxide ($TiO_2$), silica ($SiO_2$), silicon oxide (SiO), copper oxide (CuO), montmorillonite (($Na,Ca)_{0.33}(Al,Mg)_2$ ($Si_4O_{10}$), bentonite ($Al_2O_{34}SiO_2H_2O$), kaolinite ($Al_2Si_2O_5$ $(OH)_4$), hectorite ($Na_{0.3}(Mg,Li)_3Si_4O_{10}(OH)_2$), and halloysite ($Al_2Si_2O_5(OH)_4$), 4'-Amino-2,3'-dimethylazobenzene ($CH_3C_6H_4N$=$NC_6H_3(CH_3)NH_2$), yttrium aluminum oxide ($Y_3Al_5O_{12}$), yttrium iron oxide ($Y_3FeO_{12}$) and nanoclay. Table 1 provides a specification of dry materials that may be used for a SPE film.

In some embodiments, the ion conducting medium is nanoclay, garnet, or mixtures thereof.

TABLE 1

Specification of Materials

| Material | Vendor | Bulk Density | D50 (μm) | Molecular Weight | Melting Point (° C.) |
|---|---|---|---|---|---|
| PEO | DOW Chemical | — | 124 | 1000 k | 66-75 |
| PVDF | Arkema | — | 15.5 | High MW | 161-168 |
| PE | Mitsui Chemicals | — | 37.2 | 2000 k | 136 |
| PTFE | Dupont | 0.485 g/cc | 351 | High MW | 327 |
| Nanoclay | Nanocor | 0.2-0.5 g/cm$^3$ | 10.3 | — | — |
| Garnet | Sigma Aldrich | — | 41.5 | 334 k | 102 |

In one example, polyethylene oxide (PEO) or polyvinylidene fluoride (PVDF) were used as ion conducting polymers, polyethylene (PE), PTFE and mixtures thereof were used as supporting matrixes, silica was used as a ceramic filler, garnet was used as ion conducting medium, and LiTFSI was used as a lithium source in a number of combinations to create an SPE dry powder formulation. Although nanoclay was used as a ceramic filler, advantageously and unexpectedly it was discovered that nanoclay increases the ionic conductivity of the SPE and therefore also acts as an ion conducting medium.

TABLE 2

Compositions of Solid Polymer Electrolytes (SPE) Formulations

| Material | SPE-1 | SPE-2 | SPE-3 | SPE-4 | SPE-5 |
|---|---|---|---|---|---|
| PEO | — | — | — | 28.2 wt % | 28.2 wt % |
| PVDF | — | 40.0 wt % | — | — | — |
| PE | 62.05 wt % | 40.0 wt % | 64.5 wt % | 28.2 wt % | 28.2 wt % |
| PTFE | — | — | — | 14.1 wt % | 14. wt % |
| Silica | 6.3 wt % | — | 3.2 wt % | 1.4 wt % | 1.4 wt % |
| Nanoclay | 31.3 wt % | 20.0 wt % | — | 14.1 wt % | — |
| Garnet | — | — | 32.3 wt % | 14.1 wt % | 21.1 wt % |
| LiTFSI | — | — | — | — | 7.0 wt % |

Figure 6:
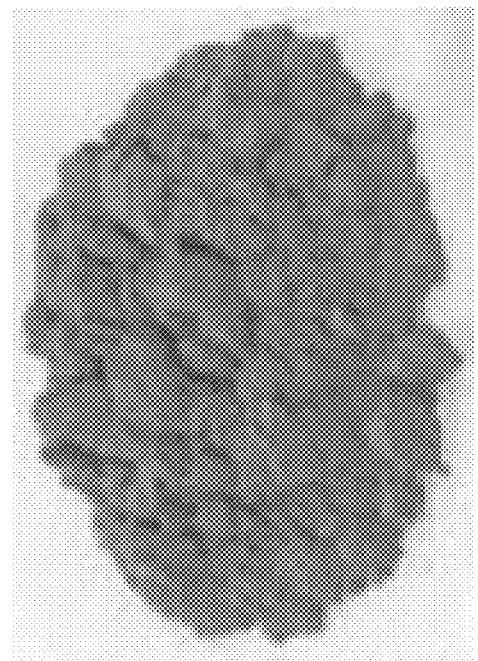
FIG. 6 shows dry mixed powders of (Panel a) SPE-2, (Panel b) SPE-3, (Panel c) SPE-4 and (Panel d) SPE-5 formulations.
Figure 6:
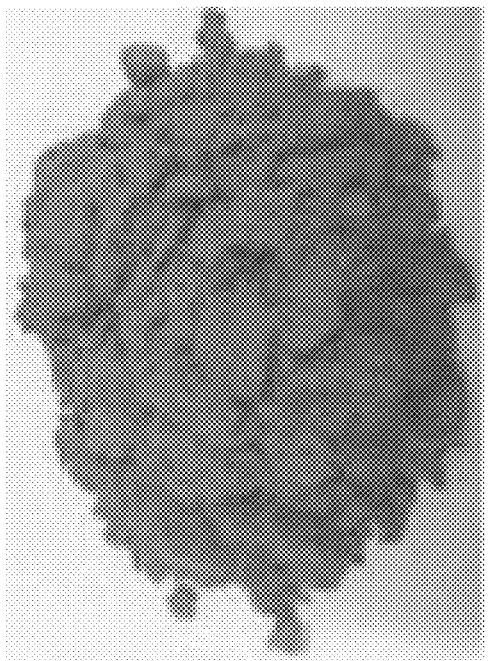
Figure 6:
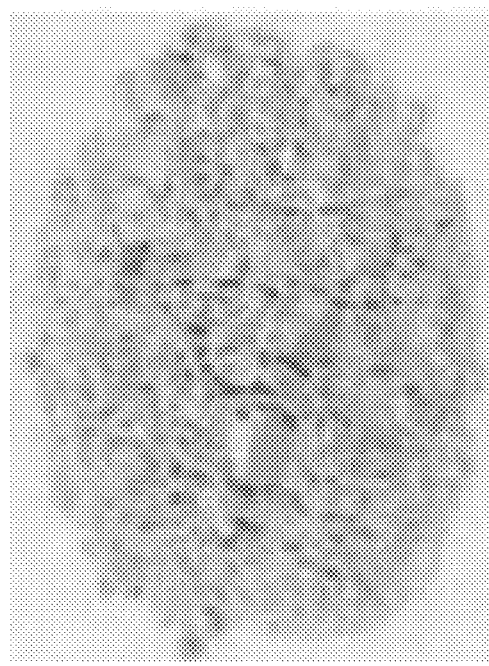
Figure 6:

Dry powder mixing of SPE dry powder formulations into a SPE dry powder mixture may be carried about by methods previously described herein, or other methods. Dry powder mixing of the dry SPE formulations described in Table 2 were carried out following the mixing procedure shown in Table 3. Typical mixing and blending methods, for example, such as a tumbler, convective, hopper, and fluidization, can be used for powder mixing. Resodyn powder mixing was carried out at 60% intensity (50G) for 5 min. Images of some of the resulting processed powders are shown in FIG. 6, wherein powder (a) refers to SPE-2, powder (b) refers to SPE-3, powder (c) refers to SPE-4, and powder (d) refers to SPE-5.

TABLE 3

Dry Powder Mixing for SPE

| Mix | Step 1 - Resodyn | Step 2 - Resodyn | Waring |
|---|---|---|---|
| SPE-1 | PE:Silica:Nanoclay | — | — |
| SPE-2 | PE:PVDF:Nanoclay | — | — |
| SPE-3 | PE:Silica:Garnet | — | — |
| SPE-4 | PE:PEO:PTFE | Nanoclay:Silica:Garnet | Yes |
| SPE-5 | PE:PEO:PTFE | Silica:Garnet:LiTFSI | Yes |

Figure 7:
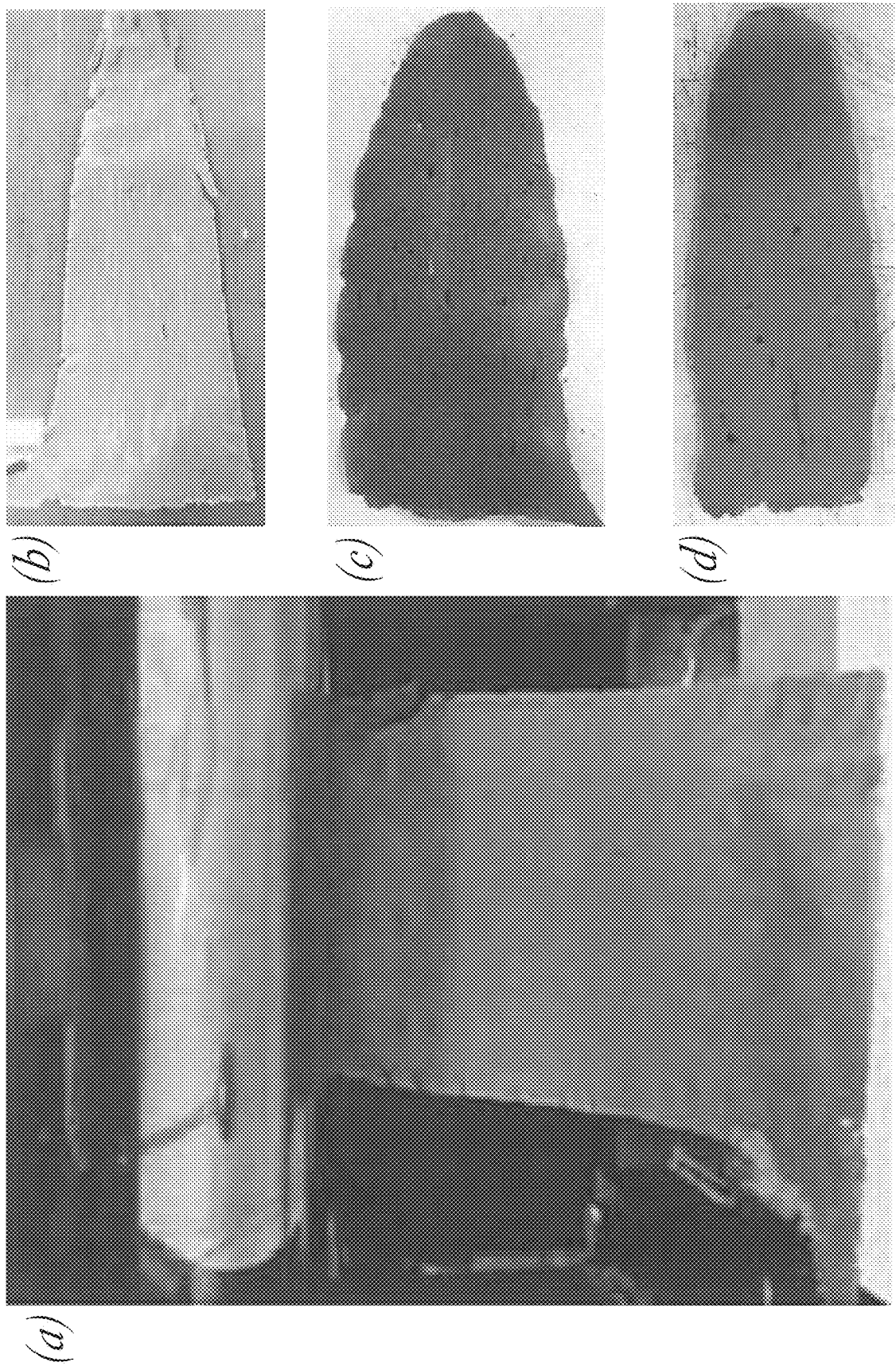
FIG. 7 shows (Panel a) an example of a dry mixed powder converted into an SPE film through a calendering process, and films formed from (Panel b) SPE-1, (Panel c) SPE-3 and (Panel d) SPE-4 dry materials.
Figure 8:
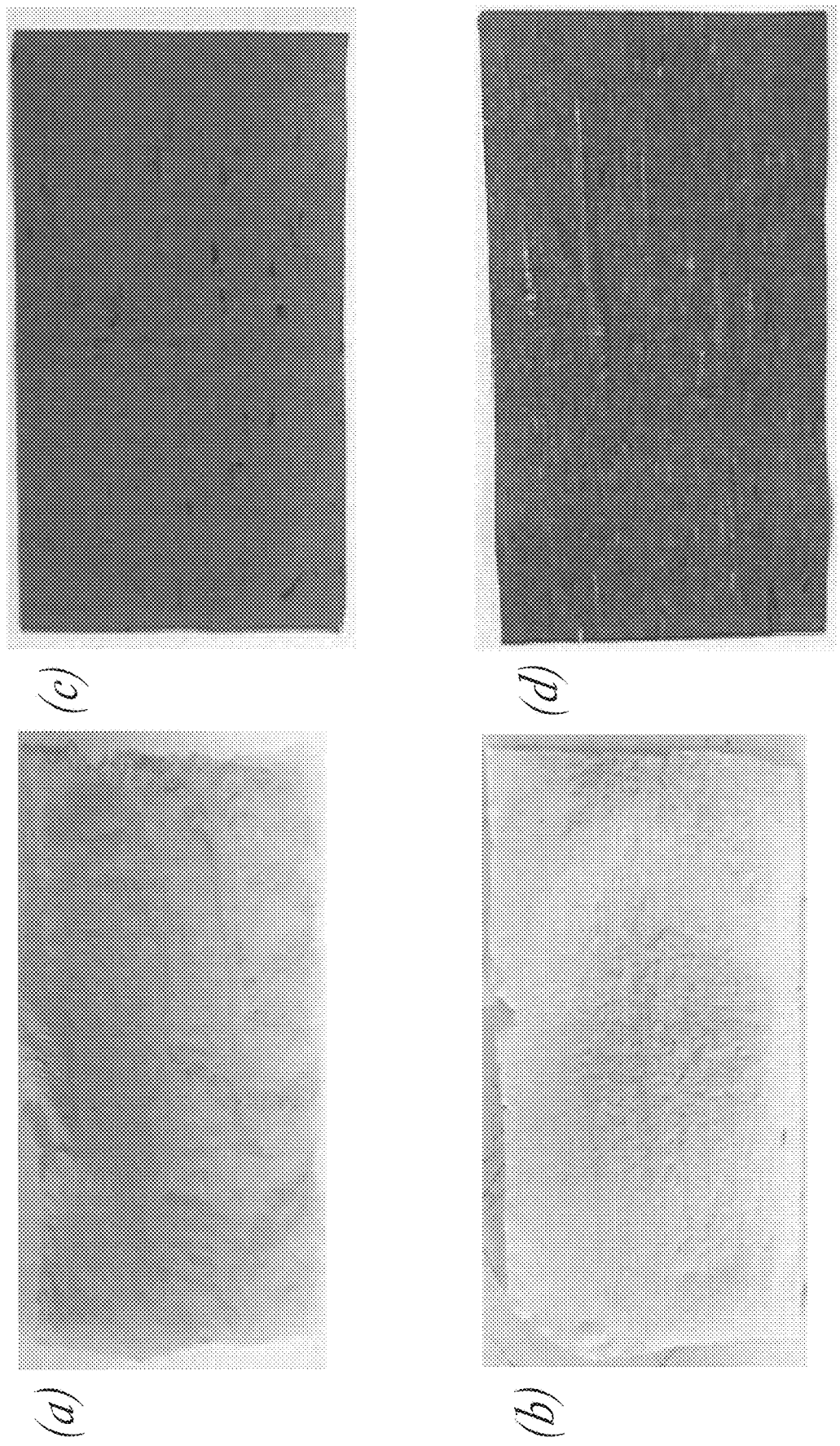
FIG. 8 shows films recalendered to desired thicknesses of (Panel a) SPE-1, (Panel b) SPE-2, (Panel c) SPE-4 and (Panel d) SPE-5 films.

Processed dry powder mixtures may be converted to dry free-standing SPE films by methods previously described or other methods. Dry SPE films were created from some of the dry powder mixtures described in Table 3 following calendering processing at parameters provided in Table 4. FIG. 7 shows the 1$^{st}$ pass calendered SPE films converted from processed dry powders, per the 1$^{st}$ Calendering process in Table 4, wherein (a) shows SPE-2 (in a calender), (b) shows SPE-1, (c) shows SPE-3, and (d) shows SPE-4; (b)-(d) are all shown after calendering. FIG. 8 shows the 1$^{st}$ pass calendered SPE films of FIG. 7 re-calendered, per the 2$^{nd}$ Calendering process in Table 4, to attain desired film thicknesses.

TABLE 4

Parameters of 1$^{st}$ and 2$^{nd}$ Calendering Processes

| | 1$^{st}$ Calendering | | 2$^{nd}$ Calendering | |
|---|---|---|---|---|
| Mix | Temperature (° C.) | Gap (μm) | Temperature (° C.) | Gap (μm) |
| SPE-1 | 100 | 102 | 150 | ≤51 |
| SPE-2 | 100 | 102 | 150 | ≤51 |
| SPE-3 | 100 | 76 | 150 | ≤51 |
| SPE-4 | 90 | 76 | 90 | ≤51 |
| SPE-5 | 80 | 76 | 80 | ≤51 |

Figure 9:
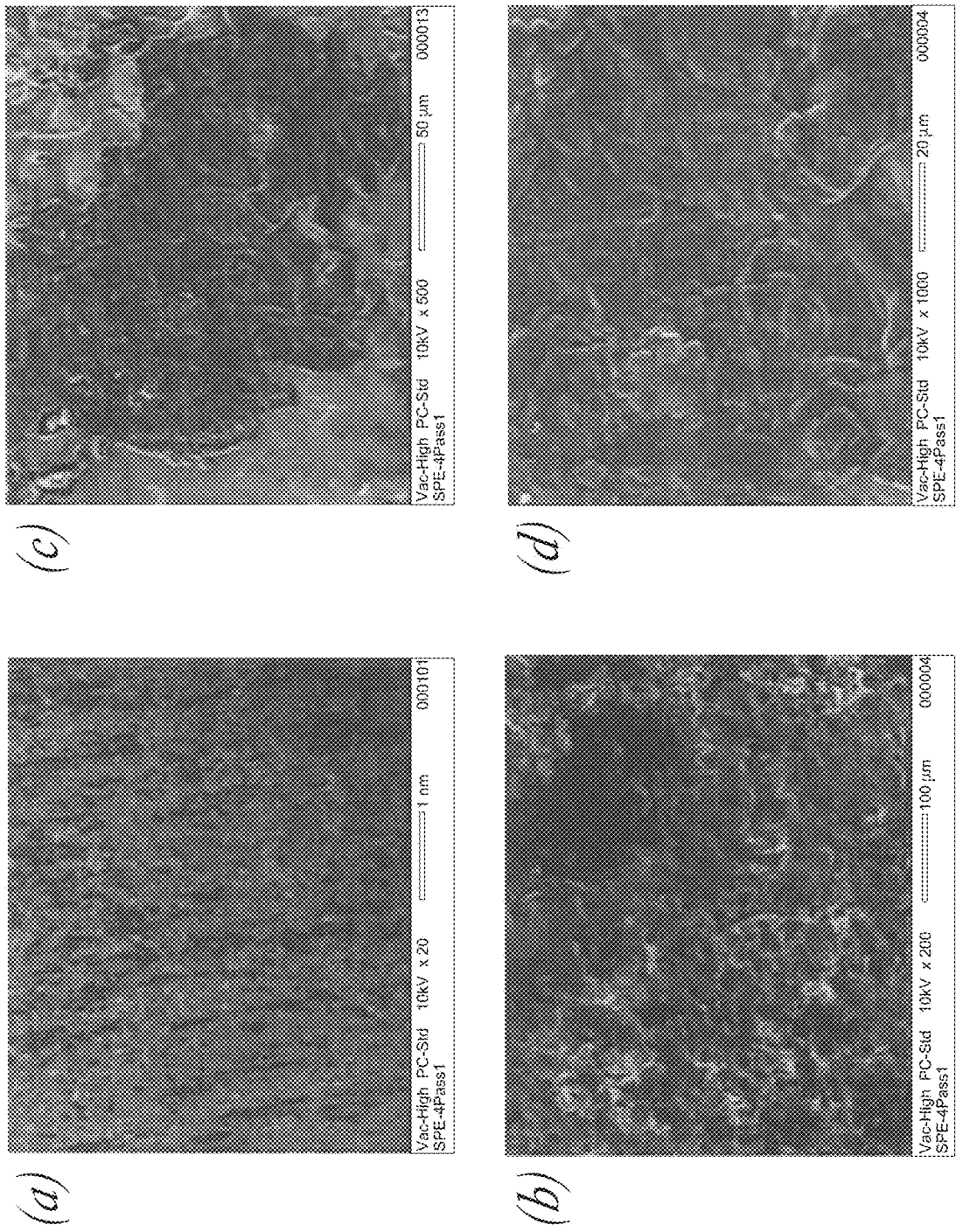
FIG. 9 depicts SEM images of the surface of a SPE-4 powder mixture converted to a film at magnifications of (Panel a) ×20, (Panel b) ×200, (Panel c) ×500 and (Panel d) ×1000.
Figure 10:
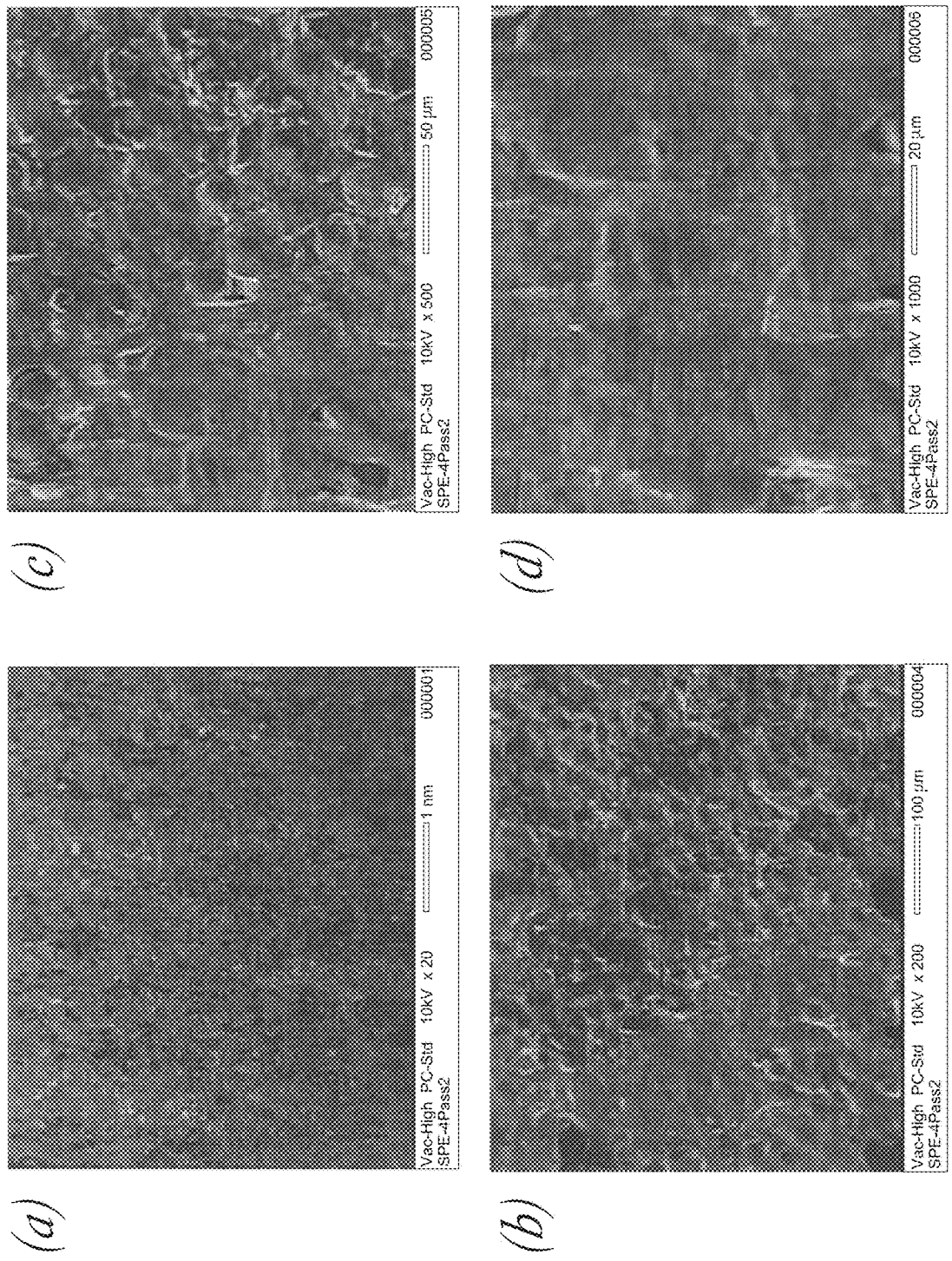
FIG. 10 depicts SEM images of the surface of a recalendered SPE-4 film at magnifications of (Panel a) ×20, (Panel b) ×200, (Panel c) ×500 and (Panel d) ×1000.

FIG. 9 shows the surface morphology of the SPE-4 film after the 1$^{st}$ calendering step, and FIG. 10 shows the surface morphology of the SPE-4 film after the 2$^{nd}$ calendering step. The 1$^{st}$ pass calendered SPE-4 film shows a rough and irregular surface, and appears to suggest phase separation between ion conducting polymer and supporting polymer matrix. The 2$^{nd}$ pass calendered SPE-4 film shows a smoother surface than the 1$^{st}$ pass calendered film and PTFE fibers. Also observed in FIG. 10 is a relatively dense SPE film without pores, which can provide higher ion conductivity and prohibit penetration of lithium dendrite.

Figure 11:
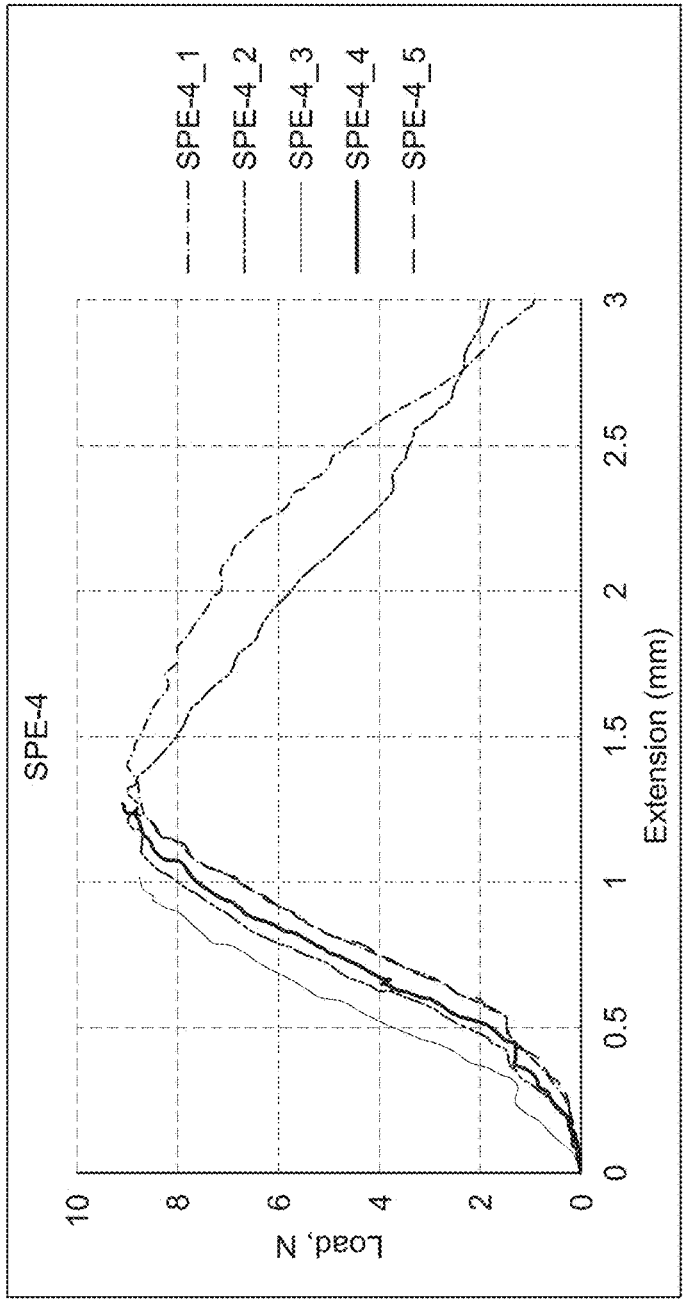
FIG. 11 depicts (Panel a) mechanical strength measurements of recalendered SPE-4 films showing Tensile (Load) vs. Extension, and (Panel b) images of the specimens after tensile measurements. Films SPE-4_3, SPE-4_4 and SPE-4_5 exceeded the limit of load (10N) in the instrument. A peak tensile strength of 10.32N was averaged from the five measurements, and an extension of 2.91 mm was average from measurements SPE-4_1 and SPE-4_2 that did not exceed the limit of load.
Figure 11:
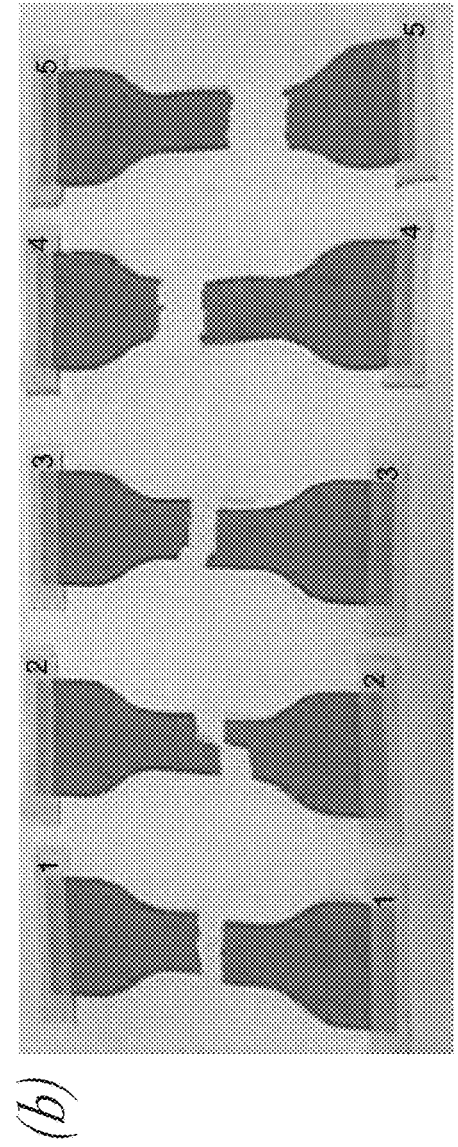

Furthermore, films after the 1$^{st}$ pass calendering step for SPE-1, SPE-2 and SPE-3 were brittle, while the films after the 2$^{nd}$ calendering step became more flexible. In addition, very flexible and strong freestanding dry films were produced in SPE-4 and SPE-5 films due to presence of fibrillated PTFE in the film. The mechanical strength of freestanding dry SPE-4 film using ILLord tensile tests exhibited very high peak tensile (10.3N) and relative long extension (2.3 mm) as presented in FIG. 11. Table 5 provides the specifications of dry SPE films used for tensile strength measurement shown in FIG. 11.

TABLE 5

1st Pass Calender Specifications of
SPE-4 Films Used in Tensile Tests

| Mix | Thickness (μm) | Weight (mg/cm$^2$) | Density (g/cc) |
|---|---|---|---|
| SPE-4_1 | 155 | 14.9 | 0.96 |
| SPE-4_2 | 149 | 14.9 | 1.00 |
| SPE-4_3 | 159 | 15.9 | 1.00 |
| SPE-4_4 | 161 | 15.7 | 0.97 |
| SPE-4_5 | 154 | 15.9 | 1.03 |

Ionic conductivity (σ) of dry SPE films were calculated using the equation:
$\sigma = (1/R_s) \times (L/A)$; where $R_s$ is bulk impedance, L is SPE film thickness, A is SPE film area.

Figure 12:
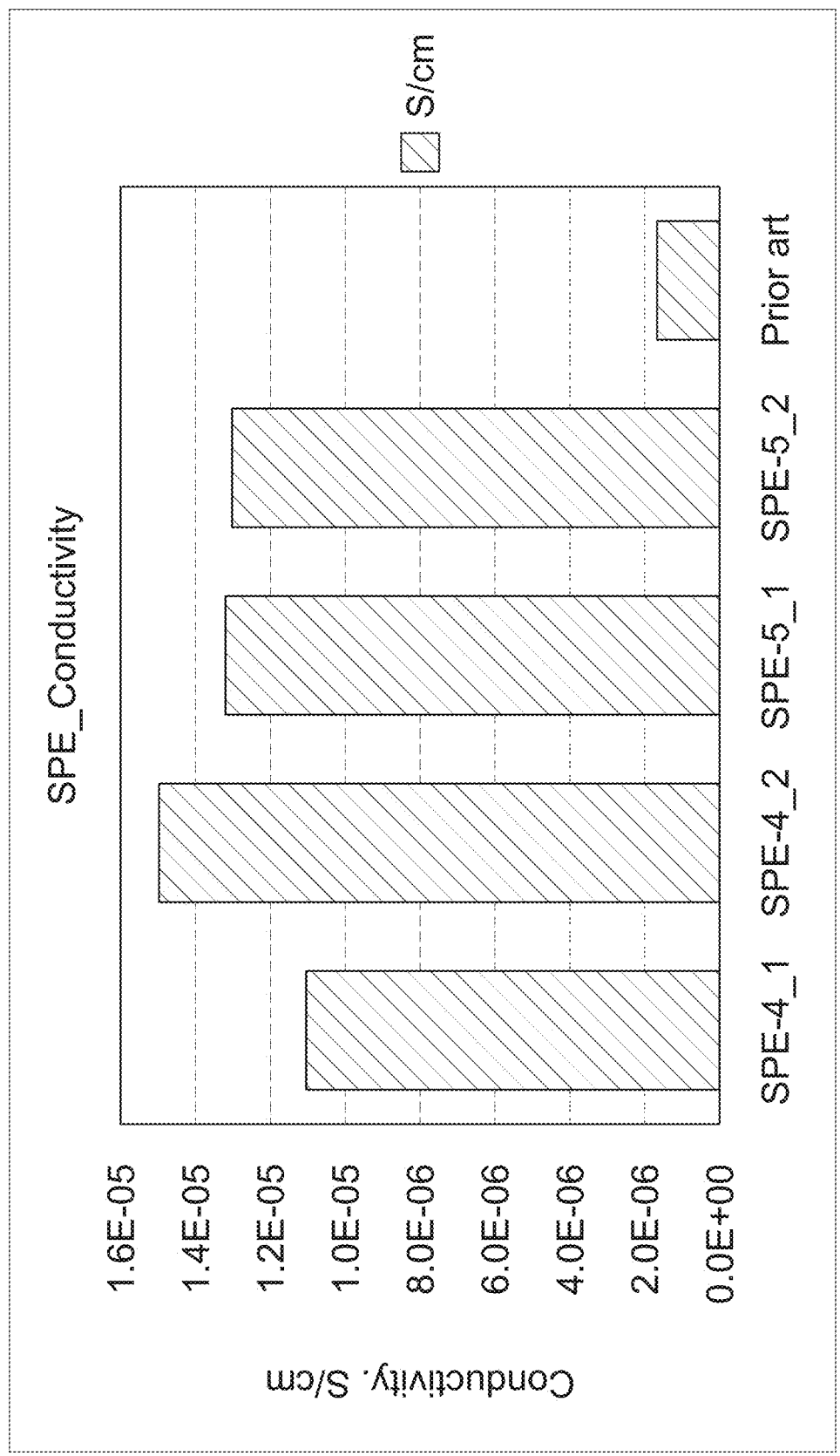
FIG. 12 depicts ionic conductivities of SPE-4 and SPE-5 films measured from A.C. impedance of Cu/SPE/Cu.

Bulk impedance was measured using a symmetric Cu/SPE/Cu cell. FIG. 12 shows room temperature ionic conductivity values for SPE-4 and SPE-5 films. The ionic conductivity for dry processed SPE films are about one order of magnitude higher than that reported in the prior art using PEO-based polymer electrolyte.

Figure 13:
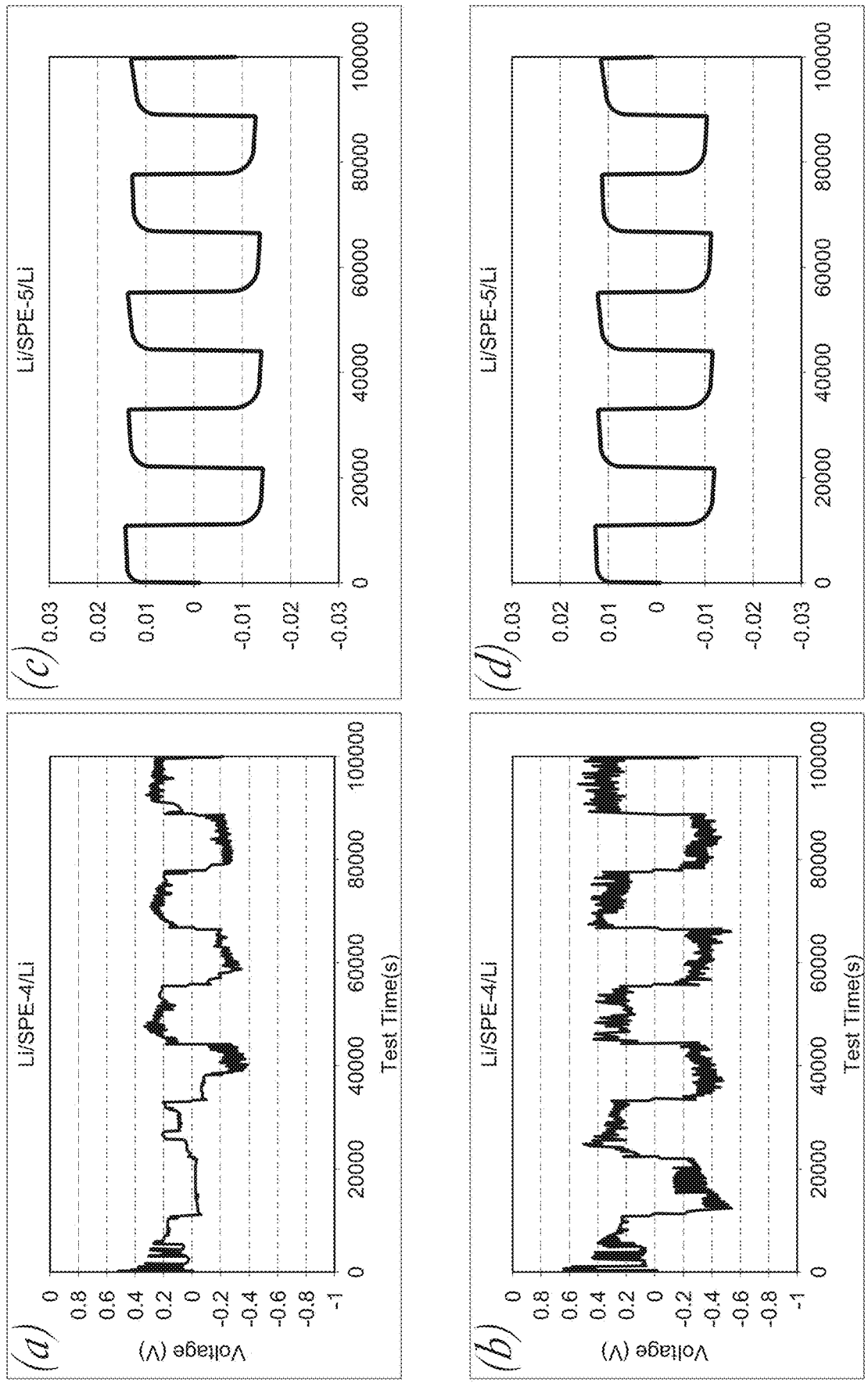
FIG. 13 depicts voltage profiles of Li/SPE/Li cells over Li stripping and deposition for (Panels a and b) SPE-4 and (Panels c and d) SPE-5, where a current density of 0.2 $mA/cm^2$ was used, Li stripping took 3 hrs, Li deposition took 3 hrs, and a rest time of 5 min was used after each positive and negative polarization.

The lithium stripping and deposition capability of dry processed SPE films using symmetric Li/SPE/Li cells was also investigated. It was found that cell voltage rose to above 2V during the 1st lithium stripping process due to low room temperature ionic conductivity of SPE films as well as high interface impedance between lithium metal and SPE film. The addition of about 0.8 mL of carbonate solvent-based electrolyte, as shown in Table 6, to the Li/SPE/Li cell greatly reduced the interface impedance and afforded stable polarization. FIG. 13 shows initial Li stripping/deposition cycling for SPE-4 and SPE-5 electrolyte films in a Li/Li cell. The voltage for cells with SPE-5 is lower and more stable compared to those with SPE-4, which can be attributed to the presence of lithium salt in SPE-5 film.

TABLE 6

Electrolyte Compositions (by Volume) Doped
to Li/SPE/Li and Graphite/SPE/Li Cells

| EC | EMC | DMC | PC | Li Salt | Additive |
|---|---|---|---|---|---|
| 1 | 2 | 0.1 | 0.02 | 1.15M LiPF$_6$ | 1% VC |

SPE films were also characterized as a separator in graphite electrode half cells, assembled using dry graphite electrode/SPE-1/Li foil stack and sealed in pouch format. About 0.8 mL of supporting lithium ion electrolyte, as shown in Table 6, was added to the cell. Drawings of three different cell configurations used in this electrochemical study are presented in FIG. 14. Specifications for the dry graphite electrode and SPE films are presented in Table 7.

Figure 14:
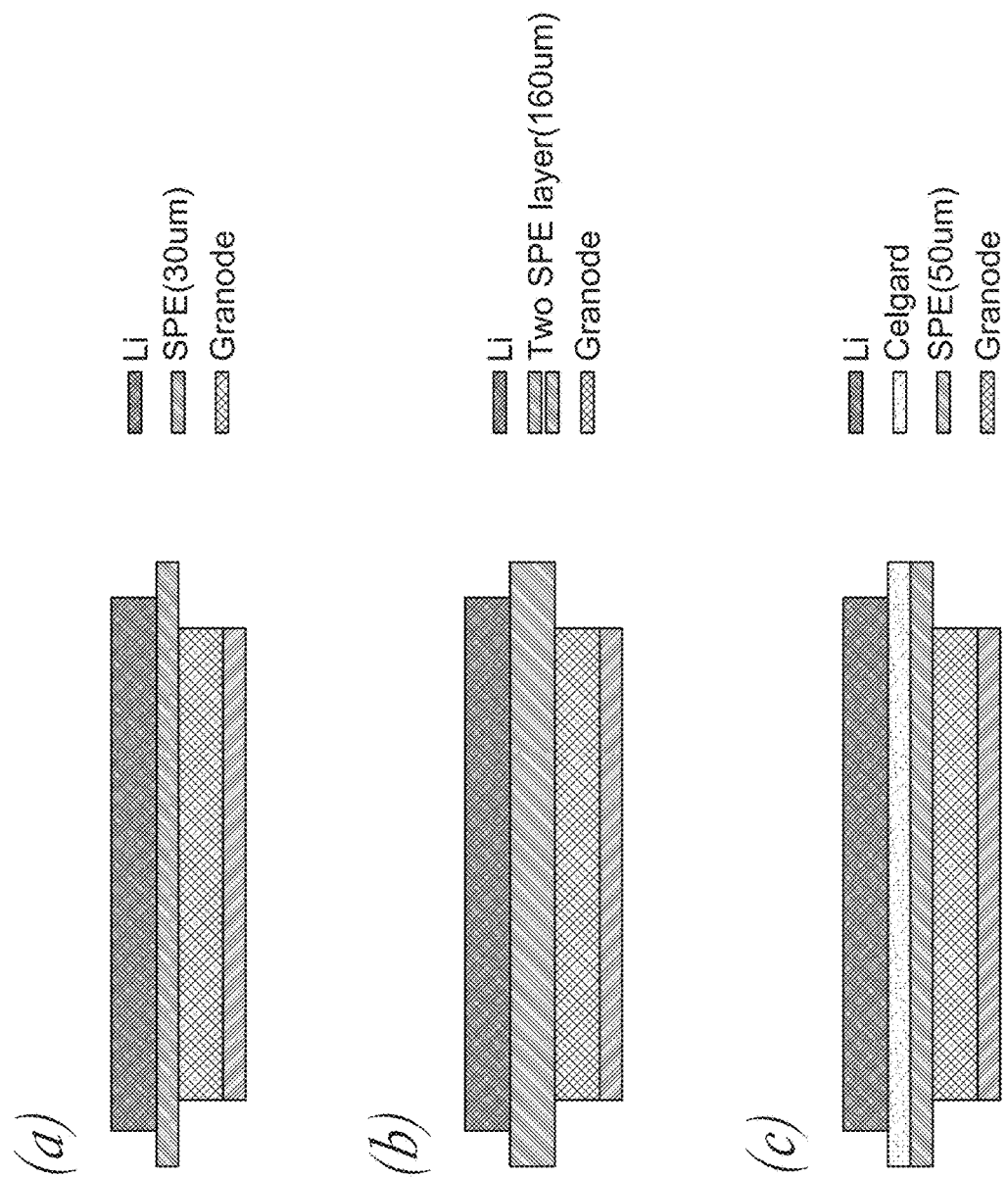
FIG. 14 depicts configurations of Gr/SPE-1/Li pouch cells used for electrochemical measurements: (Panel a) Cell 1 with one SPE layer, (Panel b) Cell 2 with two SPE layers, and (Panel c) Cell 3 with a Celgard/SPE layer.
Figure 15:
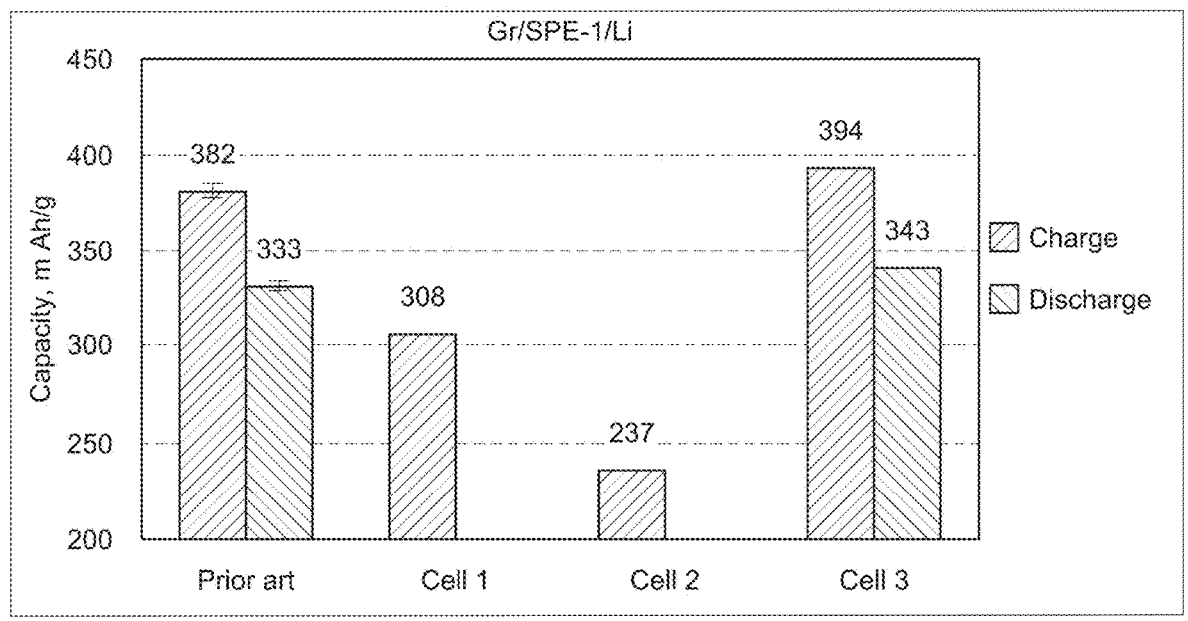
FIG. 15 depicts (Panel a) $1^{st}$ cycle capacities and (Panel b) coulombic efficiencies of graphite/SPE-1/Li pouch cells Cell 1, Cell 2 and Cell 3 shown in FIG. 14.
Figure 15:
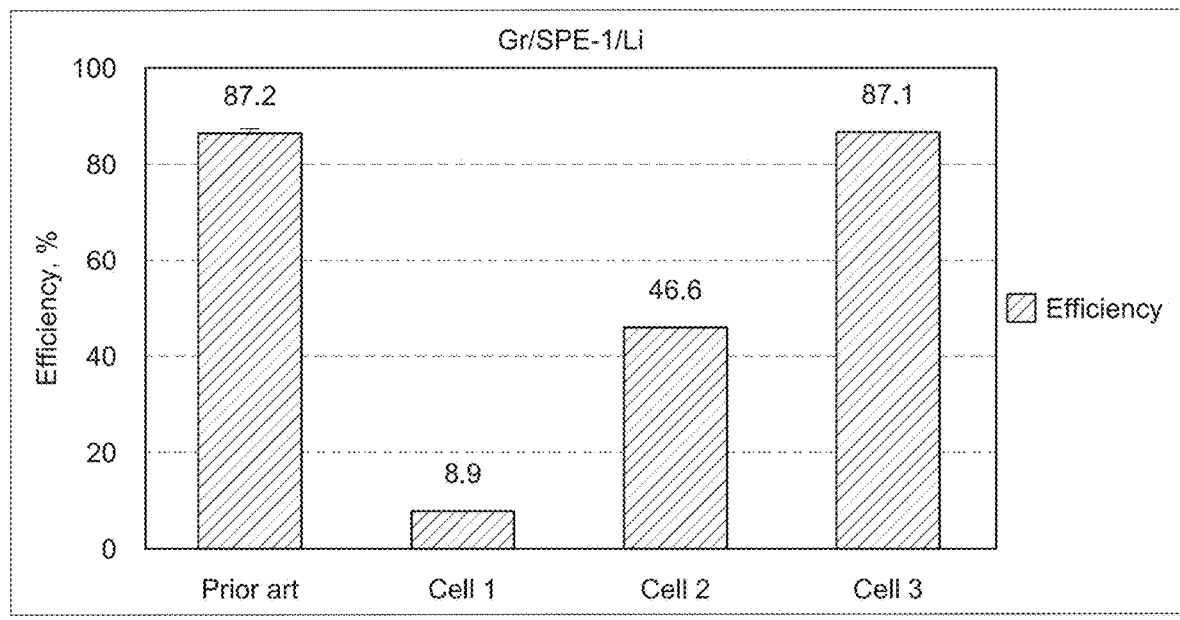
Figure 16:
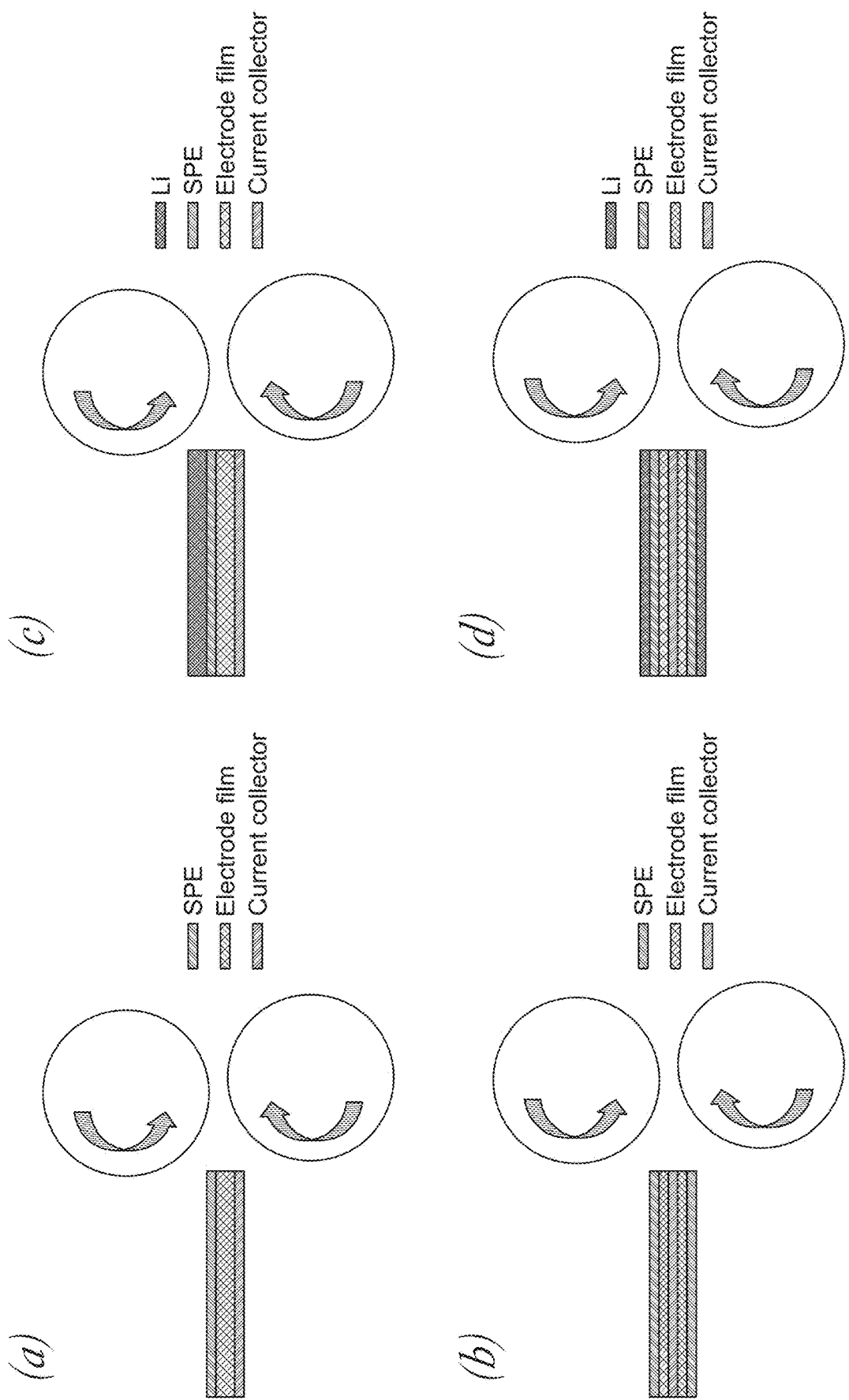
FIG. 16 depicts (Panels a, b, c and d) a number of solid state architectures of direct lamination of SPE layers with dry electrodes.

FIG. 15 shows electrochemical capacity and coulombic efficiency of the graphite electrodes with three different cell configurations, as depicted in FIG. 14. It is noted that the SPE-1 film is a rigid and porous film, and does not contain an ionic conducting medium or a lithium salt. Cell 1 and 2 exhibited poor electrochemical performance, which may be due to poor electrolyte wettability against SPE-1 film and/or poor mechanical stability of porous SPE-1 film, which in turn may be prone to penetration of lithium dendrite and/or incompatibility of carbonate solvent-based non-aqueous lithium ion electrolyte with the SPE-1 film. However, Cell 3 showed capacity and efficiency comparable to the prior art, which is comprised of a dry graphite electrode incorporated with a lithium ion electrolyte, as shown in Table 6, and a commercial polypropylene (PP) separator (from Celgard).

TABLE 7

Specifications of Dry Graphite Electrodes

| | | | Graphite Electrode | | |
|---|---|---|---|---|---|
| Cell Number | SPE Thickness (μm) | Separator Configuration | Loading (mg/cm$^3$) | Denisty (g/cc) | Porosity (%) |
| Cell 1 | 30 | 1 Layer SPE | 19.7 | 1.63 | 22.3 |
| Cell 2 | 160 | 2 Layer SPE | 19.6 | 1.57 | 25.4 |
| Cell 3 | 50 | 1 Layer SPE/1 Layer PP | 19.5 | 1.57 | 25.2 |

FIG. 17 depicts solid state architectures of direct lamination of SPE layers with dry electrodes, wherein (a) depicts a single sided SPE/Electrode, (b) depicts a double sided SPE/Electrode, (c) depicts a single sided Li/SPE/Electrode (SS), (d) depicts a double sided Li/SPE/Electrode. Also as shown in FIG. 17, the layers of material may be laminated through a calendering process.

Solid State Gradient Electrodes

Solid state electrodes may involve blending a dry solid electrolyte additive with a dry active material in a dry process to produce a dry electrode film, as previously described herein, in such a way so that a gradient electrolyte additive distribution is achieved in the solid state electrode. In some embodiments, in order to produce a gradient electrolyte additive distribution, a multitude of solid state dry electrode films are created wherein concentrations of the solid electrolyte additive increase with each successive electrode film. In some embodiments, the multitude of solid state dry electrode films are calendered together to form a solid state dry electrode film with a gradient of solid electrolyte additive concentration, or graded solid state dry electrode film, in the direction of film's thickness. In some embodiments, such a graded solid state dry electrode film may be used in a solid state energy storage device without the use of an independent electrolyte separator because the side of the graded solid state dry electrode film with a higher concentration of solid electrolyte additive may act as an electrolyte separator within the device.

In some embodiments, at least one of the layers of the graded solid state dry electrode film comprises a solid electrolyte additive concentration of about or greater than about 20 wt %, about or greater than about 30 wt %, about or greater than about 40 wt %, about or greater than about 50 wt %, about or greater than about 60 wt %, about or greater than about 70 wt %, about or greater than about 80 wt %, about or greater than about 90 wt % or about 100 wt %, or any range of values therebetween. In some embodiments, at least one of the layers of the graded solid state dry electrode film comprises a solid electrolyte additive concentration of about or greater than about 40 wt %. In some embodiments, one of the exterior layers of the graded solid state dry electrode film comprises a solid electrolyte additive concentration of about or greater than about 20 wt %, about or greater than about 30 wt %, about or greater than about 40 wt %, about or greater than about 50 wt %, about or greater than about 60 wt %, about or greater than about 70 wt %, about or greater than about 80 wt %, about or greater than about 90 wt % or about 100 wt %, or any range of values therebetween.

While certain embodiments have been described, these embodiments have been presented by way of example only, and are not intended to limit the scope of the disclosure.

Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A dry composite solid polymer electrolyte (SPE) film of an energy storage device, comprising:
   a dry ion conducting polymer;
   a dry lithium source;
   a dry binder comprising a fibrillized binder;
   an ion conducting medium; and
   a dry filler material,
   wherein the SPE film is free-standing and absent of solvent residue.

2. The SPE film of claim 1, wherein the dry ion conducting polymer is selected from polyethylene oxide (PEO), polyvinylidene fluoride (PVDF), poly(methylene oxide), polyoxymethylene, poly(vinyl alcohol) (PVA), poly(vinyl pyrrolidone) (PVP), poly(methyl methacrylate), poly(vinyl acetate), poly(vinylchloride), poly(oxyethylene)$_9$methacrylate, poly(ethylene oxide) methyl ether methacrylate, and poly(propylenimine), and combinations thereof.

3. The SPE film of claim 1, wherein the dry lithium source is selected from lithium perchlorate (LiClO$_4$), lithium tetrafluoroborate (LiBF$_4$), lithium hexafluorophosphate (LiPF$_6$), lithium bis(trifluoromethane sulfonimide) (LiTFSI) (Li(C$_2$F$_5$SO$_2$)$_2$N), lithium bis(oxalato)borate (LiB(C$_2$O$_4$)$_2$), lithium trifluoromethanesulfonate (LiCF$_3$SO$_3$), lithium bis(pentafluoroethanesulfonyl)imide (C$_4$F$_{10}$LiNO$_4$S$_2$), lithium bis(fluorosulfonyl)imide (F$_2$LiNO$_4$S$_2$), lithium difluoro(oxalato) borate (LiBF$_2$(C$_2$O$_4$)), lithium difluorophosphate (F$_2$LiO$_2$P), lithium trifluorochloroborate (LiBF$_3$Cl), lithium hexafluoroarsenate (LiAsF$_6$), Li$_{6.4}$La$_3$Zr$_{1.4}$Ta$_{0.6}$O$_{12}$, Li$_7$La$_3$Zr$_2$O$_{12}$, Li$_{10}$SnP$_2$S$_{12}$, Li$_3$xLa$_{2/3x}$TiO$_3$ (wherein 0<x<2/3), Li$_{0.8}$La$_{0.6}$Zr$_2$(PO$_4$)$_3$, Li$_{1+x}$Ti$_{2-x}$Al$_x$(PO$_4$)$_3$ (wherein 0<x<2), Li$_{1+x+y}$Ti$_{2-x}$Al$_x$Si$_y$(PO$_4$)$_{3-y}$ (wherein 0<x<2 and 0<y<3), and LiTi$_x$Zr$_{2-x}$(PO$_4$)$_3$(wherein 0<x<2), and combinations thereof.

4. The SPE film of claim 1, wherein the dry filler material is selected from titanium oxide (TiO$_2$), silica (SiO$_2$), silicon oxide (SiO), copper oxide (CuO), montmorillonite ((Na,Ca)$_{0.33}$(Al,Mg)$_2$(Si$_4$O$_{10}$), bentonite (Al$_2$O$_{34}$SiO$_2$H$_2$O), kaolinite (Al$_2$Si$_2$O$_5$(OH)$_4$), hectorite (Na$_{0.3}$(Mg,Li)$_3$Si$_4$O$_{10}$(OH)$_2$), and halloysite (Al$_2$Si$_2$O$_5$(OH)$_4$), 4'-Amino-2,3'-dimethylazobenzene (CH$_3$C$_6$H$_4$N=NC$_6$H$_3$(CH$_3$)NH$_2$), yttrium aluminum oxide (Y$_3$Al$_5$O$_{12}$), yttrium iron oxide (Y$_3$Fe$_5$O$_{12}$) and nanoclay, and combinations thereof.

5. The SPE film of claim 1, wherein the ion conducting medium is selected from nanoclay, garnet, and combinations thereof.

6. The SPE film of claim 1, wherein the dry binder is selected from the group consisting of polyethylene (PE), polytetrafluoroethylene (PTFE), and combinations thereof.

7. A separator for an energy storage device, the separator comprising the SPE film of claim 1.

8. The SPE film of claim 1, wherein the SPE film comprises a thickness of about 160 μm.

9. The SPE film of claim 1, wherein the SPE film has a film density of at least 0.9-1.1 g/cm$^3$.

10. An energy storage device comprising:
   the SPE film of claim 1;
   a cathode;
   an anode; and
   a housing, wherein the SPE film, the cathode and the anode are positioned within the housing.

11. The energy storage device of claim 10, wherein the energy storage device comprises a solid-state capacitor or a solid-state battery.

\* \* \* \* \*

UNITED STATES PATENT AND TRADEMARK OFFICE
CERTIFICATE OF CORRECTION

Page 1 of 2

PATENT NO. : 12,300,805 B2
APPLICATION NO. : 17/291491
DATED : May 13, 2025
INVENTOR(S) : Matt Petrowsky It is certified that error appears in the above-identified patent and that said Letters Patent is hereby corrected as shown below:

On the Title Page

Page 2, Column 2, Line 3, under Other Publications, delete "State lonics, 262," and insert --State Ionics, 262,--.

In the Specification

In Column 1, Lines 67, delete "$Li_{6.4}La_3Zr_{1.4}Ta_{0.6}O_2$, $Li_{10}SnP_2S_{12}$," and insert --$Li_{6.4}La_3Zr_{1.4}Ta_{0.6}O_{12}$, $Li_{10}SnP_2S_{12}$,--.

In Column 2, Line 6, delete "110 sm. In" and insert --110 μm. In--.

In Column 3, Line 30 (Approx.), delete "$Li_3xLa_{2/3x}TiO_3$," and insert --$Li_3xLa_{2/3-x}TiO_3$,--.

In Column 8, Line 48, delete "$Li_{6.4}La_3Zr_{1.4}Ta_{0.6}O_2$, $Li_7La_3Zr_2O_{12}$," and insert --$Li_{6.4}La_3Zr_{1.4}Ta_{0.6}O_{12}$, $Li_7La_3Zr_2O_{12}$,--.

In Column 9, Line 62, delete "bis(trifluoromethansulfonyl)imide" and insert --bis(trifluoromethanesulfonyl)imide--.

In Column 9, Line 63, delete "lithium trifluoromethansulfonate ($LiSO_3CF_3$)," and insert --lithium trifluoromethanesulfonate ($LiSO_3CF_3$),--.

In Column 28, Line 45, delete "$Li_3xLa_{2/3x}TiO_3$," and insert --$Li_3xLa_{2/3-x}TiO_3$,--.

In Column 29, Line 26 (Approx.), delete "conducting medium." and insert --conducting medium. Table 2 provides five such dry SPE formulations.--.

In Column 32, Line 9 (Approx.), delete "Denisty" and insert --Density--.

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,300,805 B2

In the Claims

In Column 35, Claim 3, Line 16 (Approx.), delete "$Li_3xLa_{2/3x}TiO_3$" and insert --$Li_3xLa_{2/3-x}TiO_3$--.

In Column 35, Claim 3, Line 19 (Approx.), delete "$LiTi_xZr_{2-x}(PO_4)_3$(wherein" and insert --$LiTi_xZr_{2-x}(PO_4)_3$ (wherein--.